(12) United States Patent
Kanazawa

(10) Patent No.: US 10,569,671 B2
(45) Date of Patent: Feb. 25, 2020

(54) BRAKE DEVICE OF VEHICULAR SEAT ADJUSTER

(71) Applicant: TF-METAL Co., Ltd., Kosai-shi, Shizuoka (JP)

(72) Inventor: Takaya Kanazawa, Kosai (JP)

(73) Assignee: TF-METAL CO., LTD., Kosai-shi (JP)

( * ) Notice: Subject to any disclaimer, the term of this patent is extended or adjusted under 35 U.S.C. 154(b) by 149 days.

(21) Appl. No.: 15/825,495

(22) Filed: Nov. 29, 2017

(65) Prior Publication Data

US 2018/0147957 A1    May 31, 2018

(30) Foreign Application Priority Data

Nov. 30, 2016  (JP) ................................ 2016-231928
Sep. 25, 2017  (JP) ................................ 2017-183107

(51) Int. Cl.

| B60N 2/16 | (2006.01) |
|---|---|
| B60N 2/18 | (2006.01) |
| B60N 2/90 | (2018.01) |
| B60N 2/225 | (2006.01) |
| B60N 2/22 | (2006.01) |
| G05G 5/02 | (2006.01) |

(52) U.S. Cl.
CPC ........... B60N 2/168 (2013.01); B60N 2/1889 (2013.01); B60N 2/2227 (2013.01); B60N 2/2254 (2013.01); B60N 2/938 (2018.02); B60N 2/943 (2018.02); G05G 5/02 (2013.01)

(58) Field of Classification Search
CPC ...... B60N 2/168; B60N 2/938; B60N 2/2254; B60N 2/2227; B60N 2/934; B60N 2/1889; G05G 5/02
See application file for complete search history.

(56) References Cited

U.S. PATENT DOCUMENTS

| 6,253,894 B1 | 7/2001 | Schumann et al. | |
| 2003/0173182 A1* | 9/2003 | Kim .................. | B60N 2/167 192/223.2 |
| 2010/0219037 A1* | 9/2010 | Cai .................. | B60N 2/938 192/223 |
| 2011/0304190 A1 | 12/2011 | Krueger et al. | |

FOREIGN PATENT DOCUMENTS

| DE | 198 07 790 A1 | 9/1999 |
| DE | 10 2011 051 837 A1 | 1/2013 |
| JP | 2002-511035 A | 4/2002 |

OTHER PUBLICATIONS

European Search Report, dated Apr. 6, 2018, 8 pages.

* cited by examiner

*Primary Examiner* — David J Hlavka
(74) *Attorney, Agent, or Firm* — Foley & Lardner LLP

(57) ABSTRACT

A brake device comprises a brake mechanism which comprises an output shaft having a drive gear secured thereto, a brake housing having a cylindrical braking surface therein and coaxially putting therein the output shaft, two pairs of clamp members movably and abreast installed in the brake housing in such a manner that paired two clamp members of each pair put therebetween an enlarged operation part of the output shaft and two springs that bias the two clamp member of each pair to pivot away from each other, in which each of the clamp members has an outer clamp surface that is slidably contactable with the cylindrical braking surface and includes larger and smaller clamp surface areas that are spaced from each other by a recess.

5 Claims, 23 Drawing Sheets

BRAKE DEVICE OF VEHICULAR SEAT ADJUSTER

BACKGROUND OF THE INVENTION

1. Field of the Invention

The present invention relates in general to brake devices of a vehicular seat adjuster, and particular to the brake devices of a type installed in a manual type seat adjuster that includes a seat lifter mechanism for manually adjusting the height of a seat portion and/or a seatback reclining mechanism for manually adjusting the angle of a seatback relative to the seat portion.

2. Description of the Related Art

Some of the above-mentioned brake devices for the manual type seat adjuster are shown in Japanese Unexamined Patent Application Publication (Tokuhyo) 2002-511035 and German Patent 19807790. The brake device shown in Japanese Unexamined Patent Application Publication (Tokuhyo) 2002-511035 generally comprises an output shaft that rotates about its axis in normal and reverse directions for driving the seat lifter mechanism or the seatback reclining mechanism, a brake mechanism that holds the output shaft with a braking force when a drive lever takes a neutral position, and a drive mechanism that rotates the output shaft in the normal or reverse direction while releasing the braking force when the drive lever is tuned in the normal or reverse direction. The brake mechanism and the drive mechanism are arranged coaxially.

The brake mechanism comprises, as major elements, a cup-shaped brake housing having an inner cylindrical wall as a braking surface, a pair of semicircular clamp members rotatably received in the brake housing in a manner to face each other and a shaft member arranged in a space defined between the pair of semicircular clamp members. That is, due to a frictional force produced between the braking surface of the brake housing and the two clamp members, the braking condition is kept.

The shaft member is integrally formed with a drive side pinion gear that is meshed with a driven side gear of, for example, the seat lifter mechanism. Each of the two clamp members has an outer peripheral surface that comprises a clamp surface slidably engageable with the braking surface of the brake housing and a support surface stepped down from the clamp surface. That is, the outer peripheral surface of each clamp member is not a simple cylindrical surface.

When, with the above-mentioned brake device set in the seat lifter mechanism, an abnormally big shock is applied to the pinion gear due to for example a vehicle collision or the like, the load or force for pressing the clamp members against the braking surface of the brake housing is instantly increased thereby to cause the braking surface of the brake housing to be broken by the clamp surfaces of the clamp members. More specifically, due to breakage of the braking surface of the brake housing, the clamp surfaces of the clamps get caught by the braking surface, and at the same time, due to inevitable deformation of the brake housing, the resistance of the clamp members against rotation is increased. In this case, the support surfaces of the clamp members are brought into contact with the braking surface of the brake housing thereby to reduce the amount by which the clamp surfaces get caught by the braking surface and restrict the amount by which the brake housing is deformed. With this operation, the brake device is suppressed from its entire breakage.

SUMMARY OF THE INVENTION

However, in the above-mentioned brake device, upon receiving abnormally big force due to vehicle collision or the like, the brake housing is deformed while breaking the braking surface thereof, and thus, deformation (viz., displacement in rotation angle) of the pinion gear of the shaft member becomes very large with respect to the load reversely applied to the pinion gear, which is undesirable.

Furthermore, to a load that is operated under a normal load usage, the brake housing is subjected to a deformation while elastically deforming the braking surface thereof, and thus, deformation (viz., displacement in rotation angle) of the pinion gear of the shaft member becomes large with respect to the load applied to the pinion gear, which tends to induce undesirable change of the height position of the seat.

For hardening the braking surface of the brake housing, the inventor applied quenching to the braking surface. However, the result made it clear that the clamps fail to suitably engage with the braking surface of the brake housing causing a lowering of the braking force.

In view of the above, an object of the present invention is to provide a brake device of a vehicular seat adjuster, which is free of the above-mentioned drawbacks.

That is, in accordance with the present invention, there is provided a brake device of a vehicular seat adjuster, which can reduce deformation (viz., displacement in rotation angle) of the pinion gear relative to the load applied to the pinion gear and increase the braking force.

According to the present invention, there is provided a brake device (7) for use with a seat adjuster, which comprises an output shaft (12) rotatable about its axis and having a drive gear (12d) secured thereto, the output shaft (12) having an operation portion (12e) thereof; a brake mechanism (9) that is able to assume a braking condition to suppresses rotation of the output shaft (12) when an external rotational force is suddenly applied the brake mechanism (9) through the drive gear (12d); a drive mechanism (10) that is able to release the braking condition of the brake mechanism (9) when a control lever (5) is turned in either one of normal and reverse directions from its neutral position, thereby allowing rotation of the output shaft (12) in either one of normal and reverse directions, wherein the brake mechanism (9) comprises a brake housing (8, 11, 111) having a cylindrical braking surface (13a, 113a); first and second pairs of clamp members (14, 14), (16, 16) that are movably installed and abreast arranged in the brake housing (8, 11, 111) in such a manner that the two clamp members (14, 14), (16, 16) of each pair face each other at their inside surfaces, each of the two clamp members (14, 14), (16, 16) of each pair having at circumferentially both ends thereof first and second clamp surfaces (26a, 26b) that are slidably engageable with the cylindrical braking surface (13a, 113a); and first and second biasing members (15, 17) that bias the first pair of clamp members (14, 14) to pivot away from each other and the second pair of clamp members (16, 16) to pivot away from each other respectively, wherein the output shaft (12) is sandwiched at the operation portion (12e) thereof between the respective inside surfaces of the first pair of clamp members (14, 14) and the respective inside surfaces of the second pair of clamp members (16, 16), so that rotation of the output shaft (12) is braked, and when a drive member (18) of the drive mechanism (10) is operated to move the first and second pairs of clamp members (14, 14), (16, 16) in a manner to cancel the sandwiched condition of the output shaft (12), the drive member (18) and the output shaft (12) are integrally rotated; wherein the first clamp surface (26a) of each clamp member (14, 16) is a larger diameter clamp surface section (26a) that is provided near one end of the inside surface of the clamp member (14, 16) and constantly in slidable contact with the cylindrical braking surface (13a) and the second clamp surface (26b) is a braking curved section (26b) that is provided near the other end of the inside surface of the clamp member (14, 16) and is normally kept away from the cylindrical braking surface (13a); and wherein the braking curved section (26b) is brakingly engageable with the cylindrical braking surface (13a) when the external rotational force is suddenly applied to the brake mechanism (9) through the drive gear (12d).

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, two embodiments of the present invention will be described in detail with reference to accompanying drawings.

For ease of understanding, in the following description, various directional terms, such as right, left, upper, lower, rightward and the like, are used. However, such terms are to be understood with respect to only a drawing or drawings on which a corresponding part or portion is shown.

Figure 1:
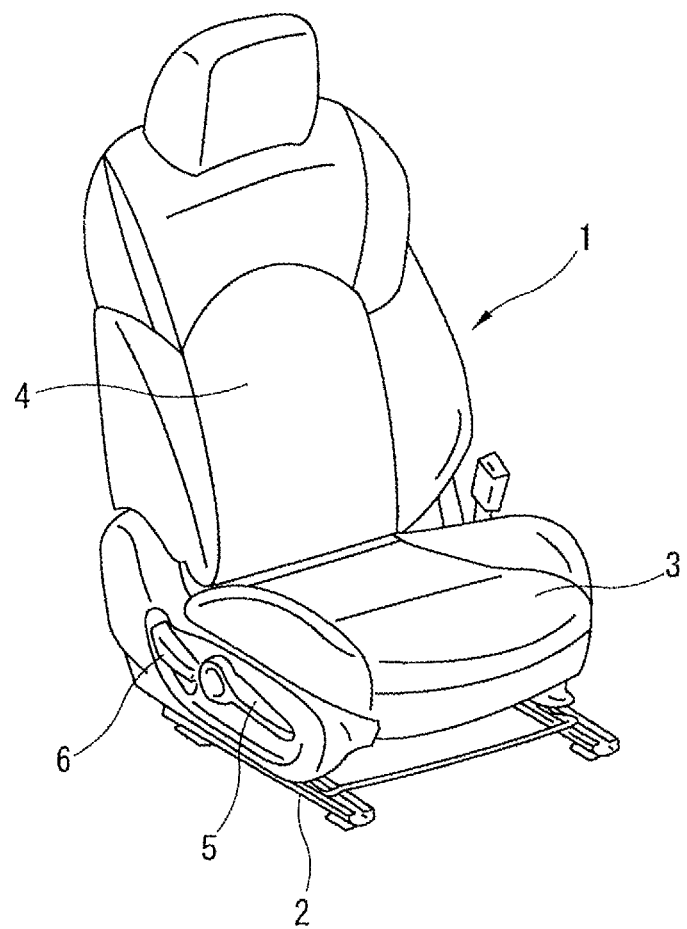
FIG. 1 is a perspective view of a vehicular seat that includes a seat lifter mechanism and a seat reclining mechanism as vehicular seat adjusters.

Referring to FIG. 1, there is shown a vehicular seat 1 including a seat slide mechanism 2 that is able to adjust a fore-and-aft position of the vehicular seat 1, a seat lifter mechanism that is able to adjust a height of a seat cushion 3 and a reclining mechanism that is able to adjust an angular position of a seatback 4 relative to the seat cushion 3. On one side of the seat cushion 3, there are provided a control lever 5 for operating the seat lifter mechanism and another control lever 6 for operating the reclining mechanism.

The seat lifter mechanism is so operated that each time the control lever 5 is turned upward from its neutral position against a certain biasing force, the seat cushion 3 is moved upward by a predetermined distance and each time the control lever 5 is turned downward from the neutral position against the biasing force, the seat cushion 3 is moved downward by the predetermined distance. With this operation, the height of the seat cushion 3 can be adjusted.

Figure 2:
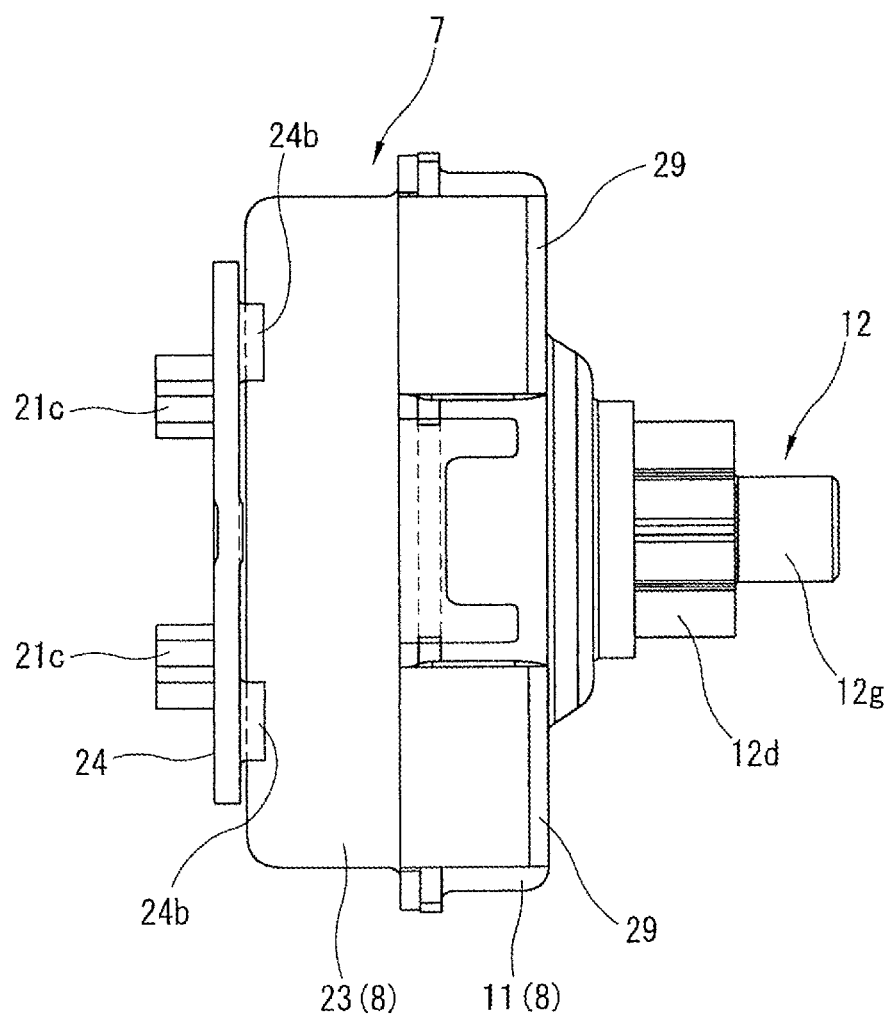
FIG. 2 is a front view of a brake device practically applied to the seat lifter mechanism of the vehicular seat of FIG. 1, which is a first embodiment of the present invention.
Figure 3:
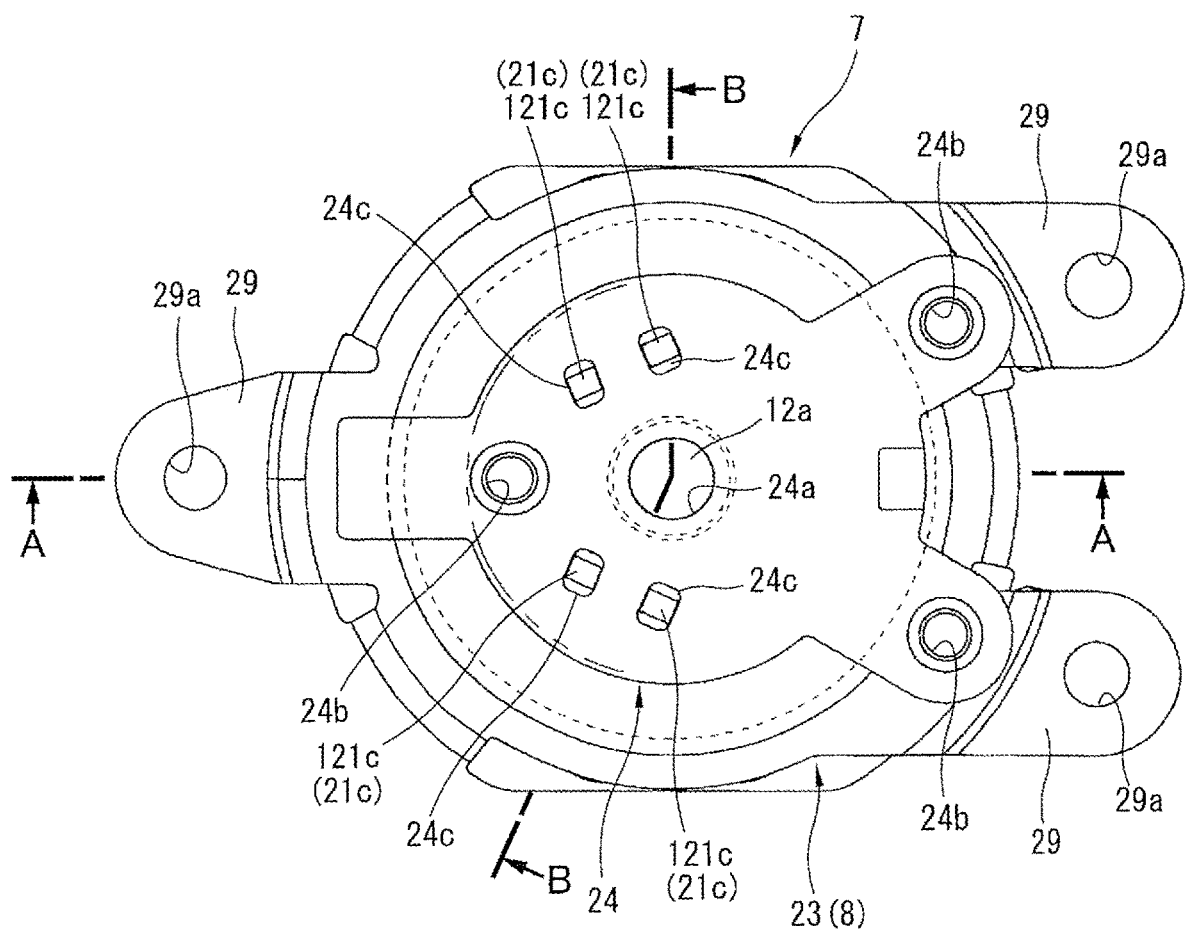
FIG. 3 is a left-side view of the brake device shown in FIG. 2.
Figure 4:
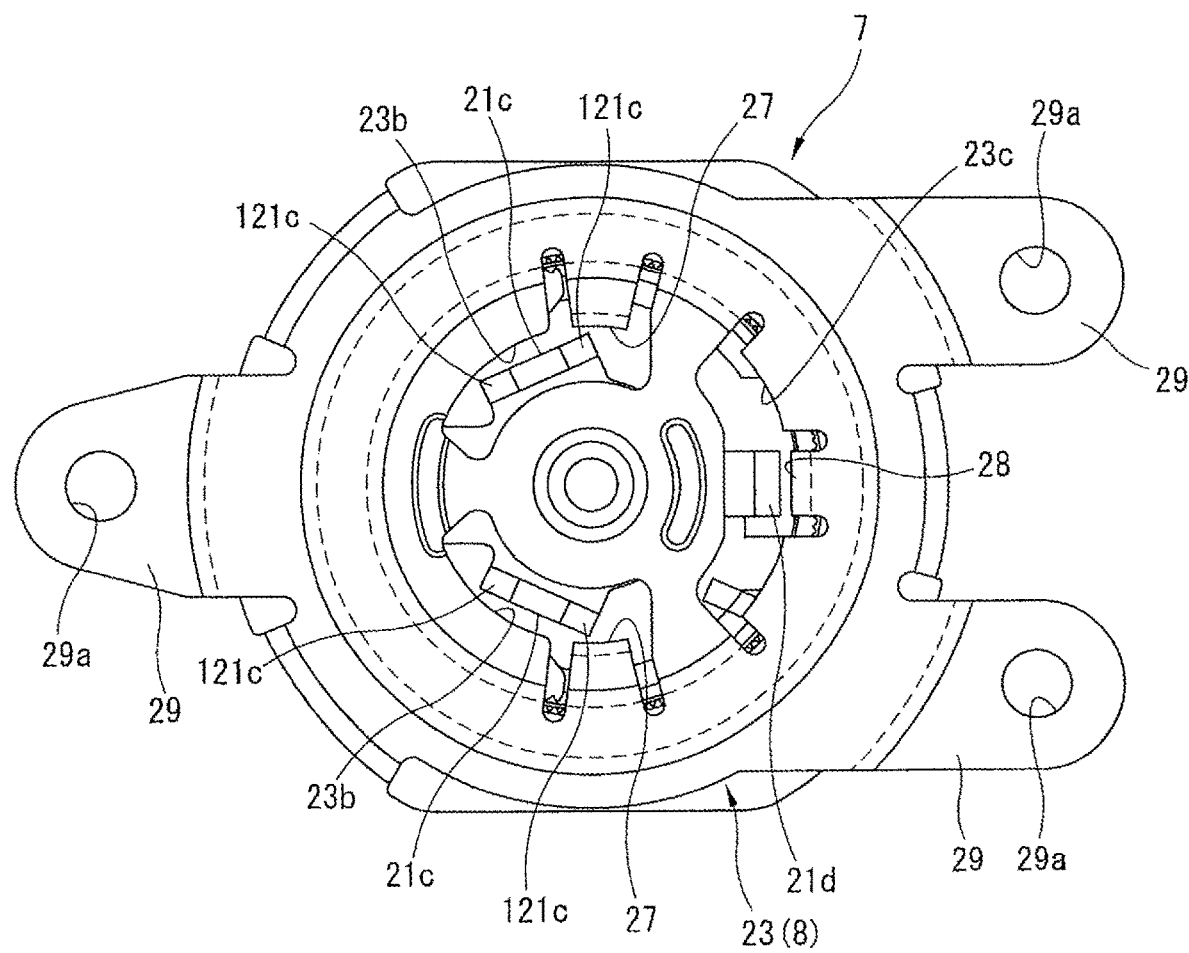
FIG. 4 is a view similar to FIG. 3 but showing a condition without a lever bracket.
Figure 5:
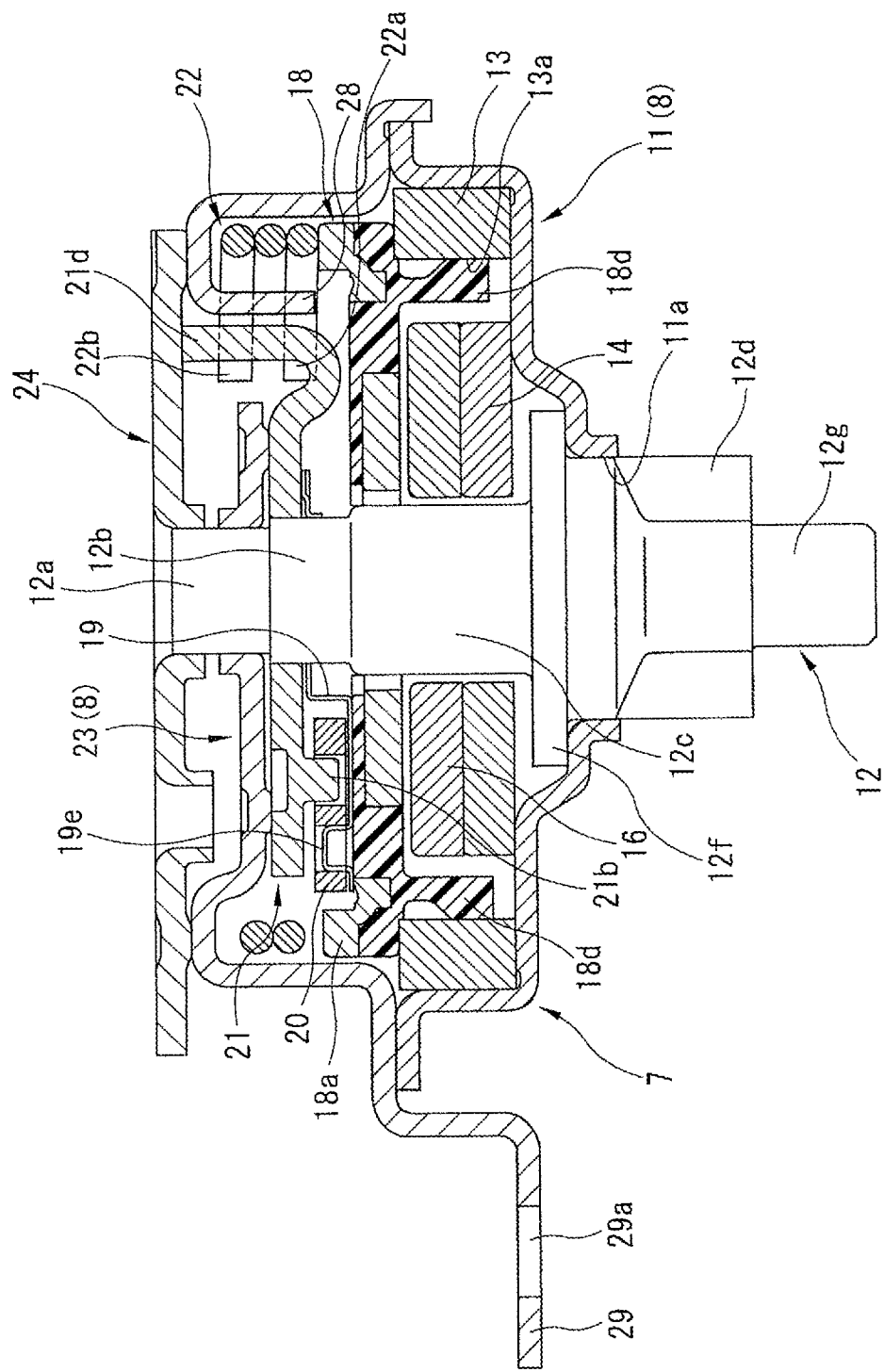
FIG. 5 is a sectional view taken along the line A-A of FIG. 3.
Figure 6:
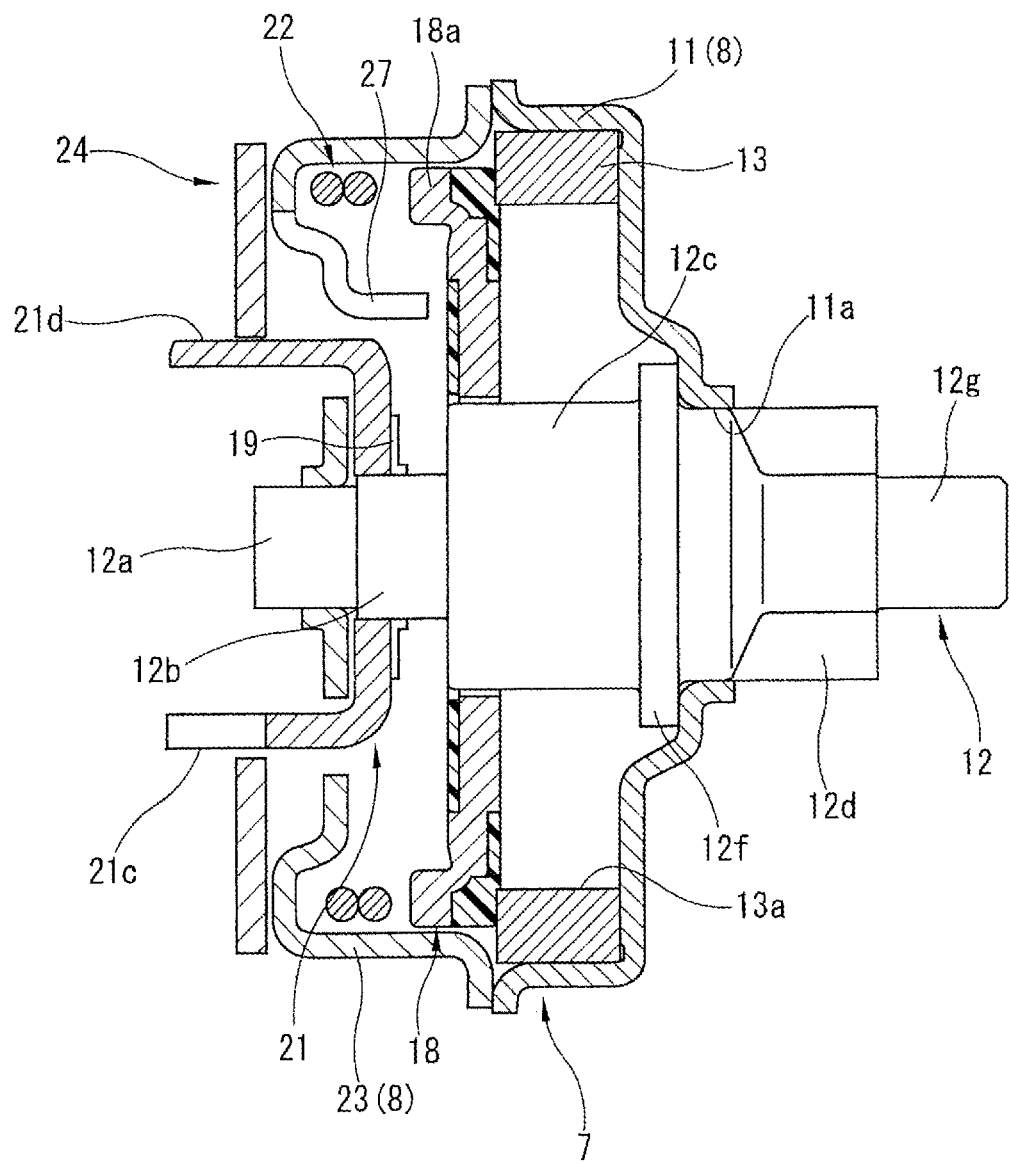
FIG. 6 is a sectional view taken along the line B-B of FIG. 3.

FIG. 2 shows a front view of a brake device 7 practically applied to the seat lifter mechanism of the vehicular seat 1, and FIG. 3 shows a view from the left of FIG. 2. FIG. 4 shows a view from the left of FIG. 2 with a lever bracket 24 removed, and FIG. 5 shows a sectional view taken along the line A-A of FIG. 3. FIG. 6 shows a sectional view taken along the line B-B of FIG. 3 and FIG. 7 shows an exploded view of the brake device 7 shown in FIG. 2.

Figure 7:
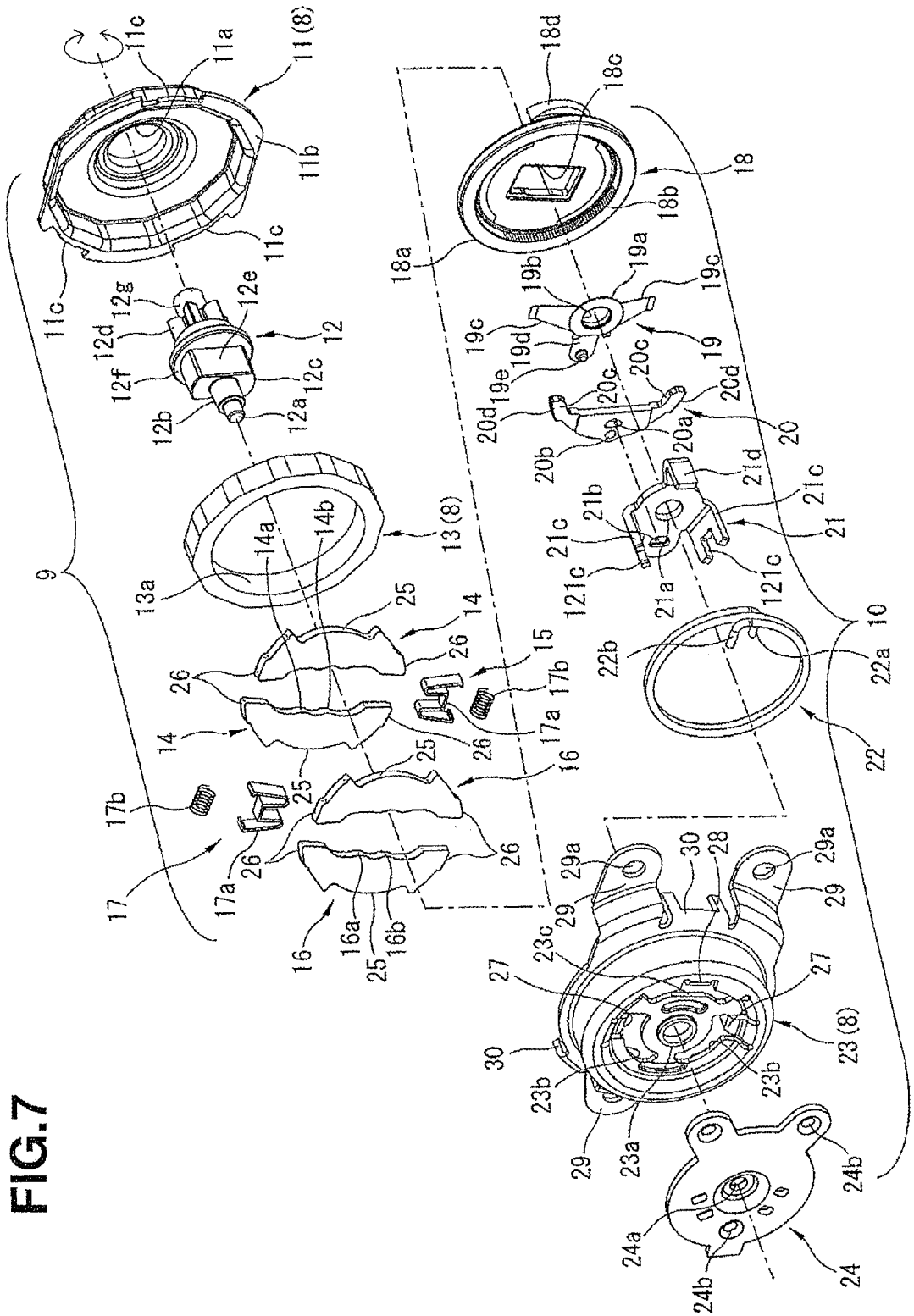
FIG. 7 is an exploded view of a brake mechanism and a drive mechanism that constitute the brake device of FIG. 2.

As will be understood from FIGS. 2 and 7, the brake device 7 comprises a cylindrical brake housing 8 that is constructed by coupling a dome-shaped housing 11 and a circular cover 23. As will be seen from FIG. 7, within the cylindrical brake housing 8, there are coaxially installed a brake mechanism 9 and a drive mechanism 10 in an aftermentioned manner. At a center portion of the brake device 7 having the brake housing 8, there axially extends an output shaft 12 that is shared by the brake mechanism 9 and the drive mechanism 10. To one end of the output shaft 12, there are connected the control lever 5 (see FIG. 1) and a lever bracket 24 which act as actuation members, and to the other end of the output shaft 12, there is integrally connected a pinion gear 12d that is exposed to the outside and acts as a driving gear.

The lever brake 24 is arranged to turn in both (viz., normal and reverse) directions from its neutral position. To the lever bracket 24, there is secured the control lever 5 (see FIG. 1) by using screws. For this securing, the lever bracket 24 is formed with screw holes 24b (see FIG. 3).

As is seen from FIG. 5, the brake device 7 is fixed to a side bracket (not shown) of the vehicular seat 1 of FIG. 1. For this fixing, as is seen from FIG. 7, connecting holes 29a formed in flanges 29 of the circular cover 23 are used. With this, the pinion gear 12d is meshed with a driven gear (not shown) used in the seat lifter mechanism.

In the brake device 7, when the lever bracket 24 is at a neutral position, the output shaft 12 is suppressed from turning even if the output shaft 12 is applied with a turning force in one or the other direction. That is, in such case, the turning of the output shaft 12 is braked. While, when, with the lever bracket 24 being at the neutral position, the lever bracket 24 is applied with a turning force in one or the other direction, the output shaft 12 is allowed to turn in the same direction together with the lever bracket 24. The rotation of the output shaft 12 is transmitted to a driven gear (not shown) of the shift lifter mechanism through the pinion gear 12d, and the rotation of the driven gear brings about a vertical movement of the seat cushion 3 of the vehicle seat 1 through a link mechanism. These operations will be well understood when referring to FIG. 2.

In the brake device 7 of this type, the stroke of the lever bracket 24 is relatively small, and thus, mostly, one-way turning of the lever bracket 24 is carried out for a plurality of times for achieving a desired purpose.

As is seen from FIGS. 2 and 7, within the cylindrical brake housing 8 constructed by a housing body 11 of the brake mechanism 9 and the circular cover 23 of the drive mechanism 10, there are coaxially installed the brake mechanism 9 and the drive mechanism 10. In the following, description of the brake and drive mechanisms 9 and 10 will be made mainly with reference to FIG. 7 by which the three-dimensional structure and arrangement of each element or part are easily understood.

As is seen from FIG. 7, the brake mechanism 9 generally comprises the housing body 11 that forms part of the brake housing 8, the output shaft 12 that is shared with the drive mechanism 10, an annular brake drum 13 that is pressed into the housing body 11, a pair of semicircular clamp members 14 that are flat in shape and installed in the brake drum 13 in a manner to face each other at respective edges thereof, a composite spring 15 that is shared by the semicircular clamp members 14, another pair of semicircular clamp members 16 that are the same as the clamp members 14 and arranged to put on the paired clamp members 14, and another composite spring 17 that is shared by the clamp members 16. Since the brake drum 13 is pressed into the housing body 11, the brake drum 13 constitutes part of the brake housing 8 together with the housing body 11.

Furthermore, as is seen from FIG. 7, the drive mechanism 10 generally comprises a drive wheel 18 that is like a shallow pan and arranged to put on the paired clamp members 16 of the brake mechanism 9, a holding plate 19 that is arranged to put on the drive wheel 18, a tooth plate 20, an input lever 21, a coil spring 22, a circular cover 23 that is arranged to face the housing body 11 of the brake mechanism 9, and a lever bracket 24 that is arranged on the outside of the circular cover 23. As will be described in detail hereinafter, the drive wheel 18 functions to release the braking condition of the brake mechanism 9.

The housing body 11 of the brake mechanism 9 is shaped like a deep plate and produced by for example pressing a circular metal plate. As shown in FIG. 7, the housing body 11 and the brake drum 13 have each a polygonal outer surface. The brake drum 13 is pressed into the housing body 11 thereby to suppress a relative rotation therebetween. A cylindrical inner surface of the brake drum 13 serves as a braking surface 13a. The thickness of the brake drum 13 is larger than that of the housing body 11.

The cylindrical housing body 11 is formed at a bottom wall thereof with a shaft hole 11a through which a base part of the pinion gear 12d of the output shaft 12 passes. Furthermore, the housing body 11 is formed at an open edge part thereof with a flange portion 11b that is formed with three engaging recesses 11c. As will be described hereinafter, these engaging recesses 11c are used for fixing the circular cover 23 to the housing body 11.

As is seen from FIG. 7, the output shaft 12 of the brake mechanism 9 is of a multi-stepped integral type that includes a smaller diameter shaft part 12a, a medium diameter shaft part 12b, a square shaft part 12c that is formed with mutually opposed two flat rectangular surfaces 12e, a circular flange part 12d that contacts with an inner bottom surface of the housing body 11 to suppress an axial displacement of the output shaft 12, a larger diameter shaft part 12g that is rotatably received in the shaft hole 11a of the housing body 11 and the pinion gear 12d that serves as a drive gear. As will be described hereinafter, the output shaft 12 is shared by the brake mechanism 9 and the drive mechanism 10 and the two flat rectangular surfaces 12e of the square shaft part 12c serve as an operation portion that apply an external force to the two pairs of clamp members 14 and 16.

The paired clamp members 14 of the brake mechanism 9 are slidably installed in the brake drum 13 while causing major surfaces of the clamp members 14 to slidably contact with the inner bottom surface of the housing body 11. That is, the paired clamp members 14 are symmetrically set in the brake drum 13 while causing peripheral edge portions thereof to slidably contact with the cylindrical braking surface 13a of the brake drum 13. The other paired clamp members 16 are also set in the brake drum 13 beside the clamp members 14 in the same manner as the clamp members 14. As is seen from FIG. 7, each of the clamp members 14 and 16 has at longitudinally opposed ends thereof projected and curved clamp surfaces 26 that slidably contact with the cylindrical braking surface 13a of the brake drum 13. The longitudinally opposed clamp surfaces 26 of each clamp member 14 or 16 have therebetween a curved recess 25, as shown.

As is seen from FIG. 7, between lower ends of the paired clamp members 14, there is set the compound spring 15 for biasing the lower ends of the clamp members 14 in opposite directions, that is, in a direction to separate the lower ends. Between upper ends of the paired clamp members 16, there is set the compound spring 17 for biasing the upper ends of the clamp members 16 in opposite directions, that is, in a direction to separate the upper ends. Each of the compound springs 15 and 17 shown in FIG. 7 includes a M-shaped plate spring 17a and a coil spring 17b operatively set between opposed legs of the M-shaped plate spring 17a. Due to work of the coil spring 17b, the opposed legs are biased in opposite directions.

As is seen from FIG. 7, the drive wheel 18 of the drive mechanism 10 comprises an annular ring portion 18a with internal teeth 18b. At a central portion of the drive wheel 18, there is provided a rectangular hole 18c into which the above-mentioned square shaft part 12c of the output shaft 12 is received to achieve an integral rotation between the output shaft 12 and the drive wheel 18. On a back side of the drive wheel 18, there are integrally formed a pair of arcuate cancelling pawls 18d that project toward the clamp members 14 and 16 of the brake mechanism 9. The arrangement of the arcuate canceling pawls 18d is well understood from FIGS. 8 and 5.

Between the rectangular hole 18c of the drive wheel 18 and the square shaft part 12c of the output shaft 12, there is provided a predetermined play. The drive wheel 18 is produced by pressing a circular metal plate with half blanking. With this, the annular ring portion 18a and the internal teeth 18b are instantly produced (see FIGS. 5 and 6). Thereafter, by using insert molding method, plastic is applied to the inner bottom surface of the annular ring portion 18a and the pair of arcuate cancelling pawls 18d are integrally formed.

As is seen from FIGS. 5, 6 and 7, upon assembly, the larger diameter part 12g of the output shaft 12 is rotatably received in the shaft hole 11a of the housing body 11, the mutually opposed two flat rectangular surfaces 12e of the square shaft part 12c of the output shaft 12 are put between the paired clamp members 14 and 14 and the other paired clamp members 16 and 16, and the square shaft part 12c of the output shaft 12 is loosely received in the rectangular hole 18c of the drive wheel 18.

Figure 8:
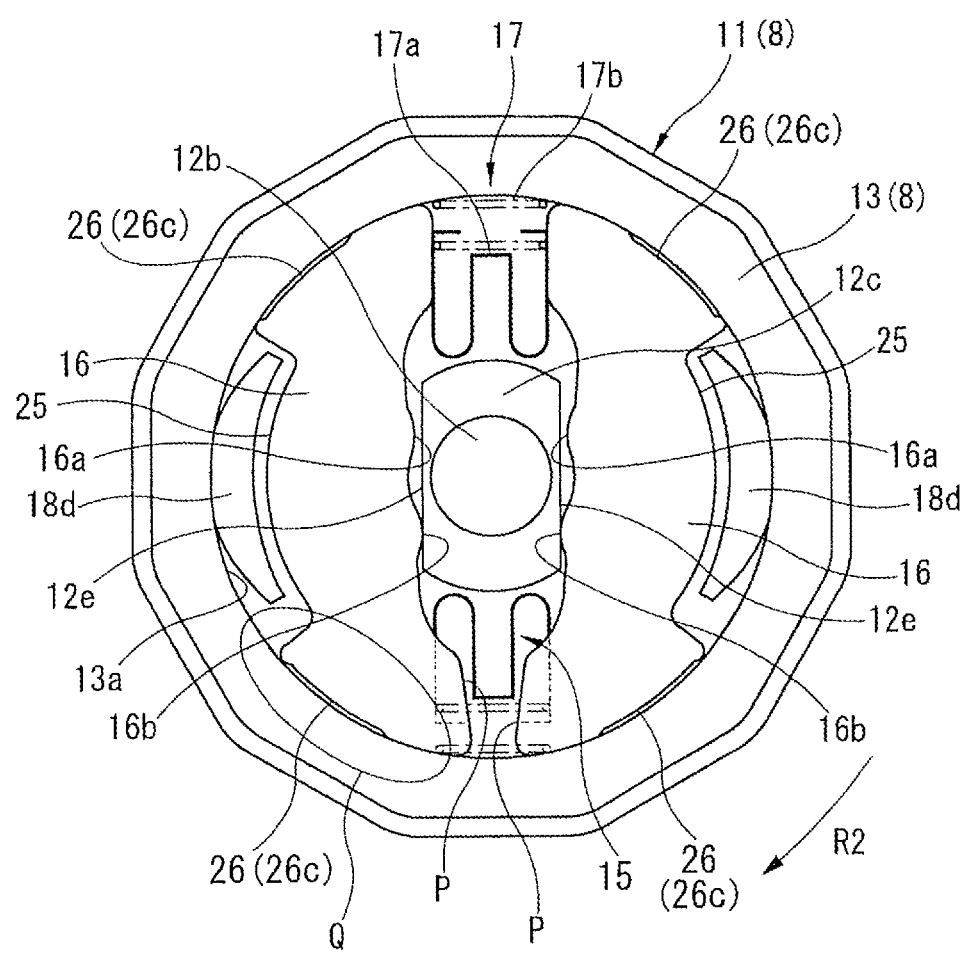
FIG. 8 is a view of the brake mechanism of FIG. 7 in a neutral condition.

At the same time, the paired cancelling pawls 18d of the drive wheel 18 are placed at the outer circumferential side of the two paired clamp members 14 and 16 while being received in the curved recesses 25 of the clamp members 14 and 16, as is seen from FIG. 8. Actually, as is seen from FIG. 8, each cancelling pawl 18d is received in the corresponding curved recesses 25 of the clamp members 14 and 16 leaving a certain space in a rotation direction of the output shaft 12. Under this condition, curved outer surfaces of the paired cancelling pawls 18d are pressed against the cylindrical braking surface 13a of the brake drum 13 due to resiliency of the cancelling pawls 18d. The positional relation between the square shaft part 12c of the output shaft 12, the paired clamp members 16 placed near the drive wheel 18 and the cancelling pawls 18d of the drive wheel 18 is well shown in FIG. 8.

That is, FIG. 8 shows the brake mechanism 9 in its neutral condition. In the drawing, denoted by "P" and "P" are mutually opposed end faces of the paired clamp members 16 and 16 that are arranged at both sides of the square shaft part 12c of the output shaft 12 (see FIG. 7). As shown, each of the end faces "P" and "P" has, at its middle part facing the corresponding flat rectangular surface 12e of the square shaft part 12c, two circular arc projections 16a and 16b. More specifically, the two circular arc projections 16a and 16b are placed respectively at upper and lower positions with respect to a horizontal line passing through a rotation center of the square shaft part 12c. As shown, between the respective upper ends of the paired clamp members 16, there is disposed the composite spring 17 for biasing the respective upper ends in mutually opposed directions. Due to the biasing force of the composite spring 17, the paired clamp members 16 are forced to rotate in opposite directions for a certain angle sliding along the cylindrical braking surface 13a of the brake drum 13, so that the distance between the lower ends of the paired clamp members 16 becomes smaller than that between the upper ends of the paired clamp members 16, as is seen from the drawing. Thus, as is seen from this drawing, the two lower circular arc projections 16b and 16b of the paired clamp members 16 are forced into contact with lower portions of the two flat rectangular surfaces 12e of the square shaft part 12c and the two upper circular art projections 16a and 16a of the paired clamp members 16 are spaced from upper portions of the two flat rectangular surfaces 12e.

The positional relation between the other paired clamp members 14 and the square shaft part 12c of the output shaft 12 is substantially the same as the above-mentioned positional relation of the paired clamp members 16. However, in case of the paired clamp members 14, the composite spring 15 is disposed between respective lower ends of the paired clamp members 14 for basing the lower ends in opposite directions. Accordingly, the distance between the lower ends of the paired clamp members 14 is larger than that between the upper ends of the paired clamp members 14. Thus, the two lower circular arc projections 14b and 14b of the paired clamp members 14 are spaced from lower portions of the two flat rectangular surfaces 12e, and the two upper circular arc projections 14a and 14a of the paired clamp members 14 are forced into contact with upper portions of the two flat rectangular surfaces 12e. Accordingly, as will be described in detail hereinafter, under rotation of the output shaft 12, the two flat rectangular surfaces 12e of the output shaft 12 are able to constantly contact with the two paired clamp members 14 and 16 in a balanced manner.

Figure 9:
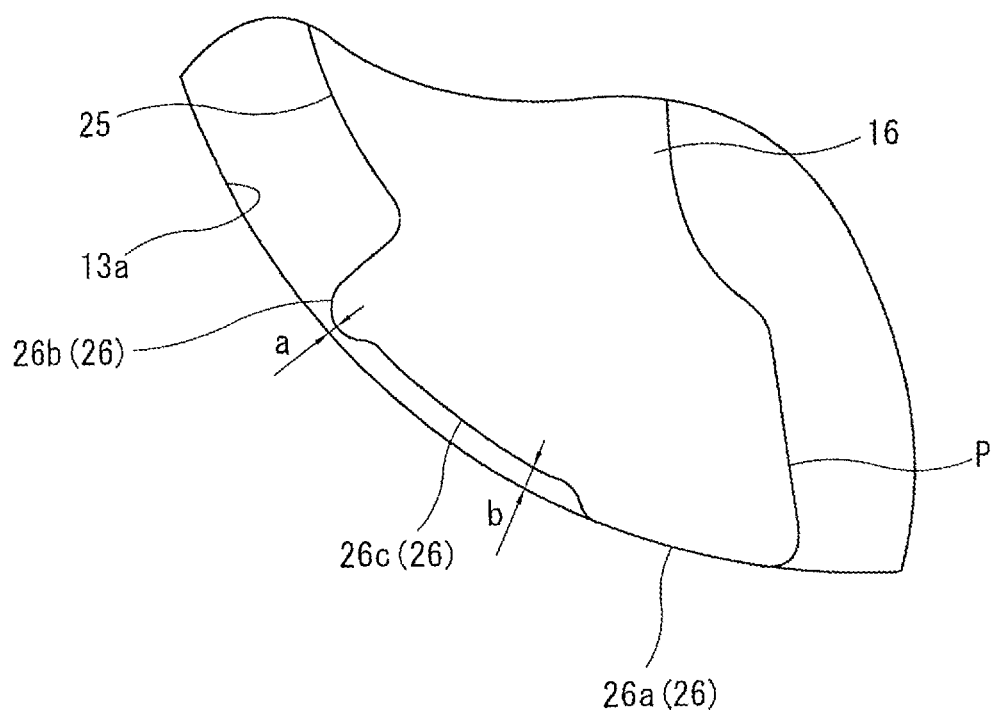
FIG. 9 is an enlarged view of the portion indicated by line Q in FIG. 8.

FIG. 9 is an enlarged view of the part indicated by line "Q" of FIG. 8. As is seen from FIGS. 8 and 9, each of the paired clamp members 16 has two clamp surfaces 26 that are spaced from each other. As is seen from FIG. 9, each clamp surface 26 comprises a larger diameter clamp surface section 26a that is provided near the end face P of the corresponding clamp member 16 to slide on the cylindrical braking surface 13a of the brake drum 13 and has a longer circumferential length, a braking curved section 26b that is provided near the curved recess 25 and an elongate curved recess 26c that is provided between the larger diameter clamp surface section 26a and the braking curved section 26b. It is to be noted that the clamp surface 26 is substantially the same in shape as that of each of the paired clamp members 14.

As will be understood from FIGS. 8 and 9, under a normal condition wherein the upper and lower larger diameter clamp surface sections 26a and 26a of each clamp member 16 are in contact with the cylindrical braking surface 13a of the brake drum 13, the upper and lower braking curved sections 26b and 26b of the clamp member 16 are separated from the cylindrical braking surface 13a of the brake drum 13. That is, for achieving this, the clearance "a" between the cylindrical braking surface 13a and the braking curved section 26b is set smaller than the depth "b" of the elongate curved recess 26c, that is, a<b.

Referring back to FIG. 7, the holding plate 19 of the drive mechanism 10 is of a plate spring type that biases objects in an axial direction of the output shaft 12. The holding plate 19 comprises a boss part 19a that has a shaft hole 19b through which the medium diameter shaft part 12b of the output shaft 12 passes, a pair of bent spring leg parts 19c that extend radially outward from the boss part 19a to be seated on the inner bottom surface of the drive wheel 18 and a bent arm part 19d that extends radially outward from the boss part 19a. The bent arm part 19d is provided with a pin 19e that projects toward the tooth plate 20. As will be seen from FIG. 7, an axial step is provided between the boss part 19a and the bent arm part 19d and the bent arm part 19d is positioned nearer to the drive wheel 18 than the boss part 19a.

As is seen from FIG. 7, the tooth plate 20 is semicircular in shape and installed in the drive wheel 18 while being put on the arm part 19d of the holding plate 19. At a middle portion of the tooth plate 20, there are formed a D-shaped shaft hole 20a and a pin hole 20b. The pin hole 20b is radially offset from the D-shaped shaft hole 20a with respect to a center axis of the output shaft 12. Both ends of the tooth plate 20 are formed with rim portions 20c that are to face against the internal teeth 18b of the drive wheel 18. Outer surfaces of these rim portions 20c are formed with external teeth 20d that are meshed with the internal teeth 18b of the drive wheel 18.

As is seen from FIG. 7, the input lever 21 serves as an input member of the drive mechanism 10. At a center part of the input lever 21, there is formed a shaft hole 21a through which the medium diameter shaft part 12b of the output shaft 12 passes for rotatably supporting the input lever 21 on the shaft part 12b. At an offset part of the input lever 21 from the shaft hole 21a, there is formed a shaft part 21b (see FIG. 5) that projects toward the tooth plate 20. The shaft part 21b has a generally semicircular cross section. This shaft part 21b is produced through a punching technique. Furthermore, the input lever 21 is formed at its peripheral edge with two bent engaging pieces 21c and one smaller bent engaging piece 21d that project toward the cover 23.

Upon assembly, the holding plate 19 and the input lever 21 are rotatably disposed about the medium diameter shaft part 12b of the output shaft 12 through their shaft holes 19b and 21a. At the same time, the shaft part 21b of the input lever 21 is rotatably held in the shaft hole 20a of the tooth plate 20 in a manner to be rotatable in a given angle. Thus, the input lever 21 and the tooth plate 20 are relatively rotatably connected to each other. The pin 19e of the holding plate 19 is rotatably held in the pin hole 20b of the tooth plate 20 to provide a relatively rotatable connection between the holding plate 19 and the tooth plate 20.

As will be understood from FIG. 7, the coil spring 22 is installed in the circular cover 23 to function to keep the input lever 21 in the neutral position. Both ends of the coil spring 22 are bent radially inward to form hook portions 22a and 22b. Upon assembly, the coil spring 22 is kept compressed radially inward keeping a state in which the hook portions 22a and 22b are respectively engaged with the bent engaging piece 21d of the input lever 21 and an after-mentioned spring engaging piece 28 of the circular cover 23. Due to a biasing force thus produced by the coil spring 22, the input lever 21 is forced to turn back to its neutral position together with the lever brake 24 and the control lever 5 when the control lever 5 (see FIG. 1) is released from a control force by which the control lever 5 has been turned in normal or reverse direction.

Referring back to FIG. 7, the circular cover 23 is a cup-shaped member produced by a draw pressing technique. As is seen from FIGS. 2 and 5, by coupling the circular cover 23 with the dome-shaped housing body 11 of the brake mechanism 9, there are produced both the housing body 11 and the brake housing 8 of the brake device 7. As is mentioned hereinabove, within the brake housing 8, there are installed both the brake mechanism 9 and the drive mechanism 10. The holding plate 19 and the tooth plate 20 are resiliently compressed between the drive wheel 18 and the input lever 21. Furthermore, because end portions of the pair of bent spring leg parts 19c of the holding plate 19 are resiliently pressed against a plastic surface lined on the bottom wall of the drive wheel 18, the holding plate 19 has a certain sliding resistance from the drive wheel 18 when they make a relative rotation therebetween.

The circular cover 23 has a shaft hole 23a at a center of its base wall, paired elongate slots 23b at both sides of the shaft hole 23a and another elongate slot 23c at a position remote from the shaft hole 23a and the paired elongate slots 23b. When the circular cover 23 is coupled with the housing body 11 of the brake mechanism 9, the shaft hole 23a is mated with the smaller diameter shaft part 12a of the output shaft 12, so that the output shaft 12 is rotatably supported by both the housing body 11 and the circular cover 23. As is seen from FIG. 4, the two bent engaging pieces 21c of the input lever 21 are inserted into the paired elongate slots 23b while projecting toward the lever bracket 24. As shown in this drawing (FIG. 4), each elongate slot 23b is sufficiently large (or long) as compared with the width size of the engaging piece 21c. Thus, the normal and reverse rotation of the lever bracket 24 is limited in angle by the length of the elongate slot 23b. That is, both ends of each elongate slot 23b serve as stoppers for limiting the rotation angle range of the lever bracket 24.

As is seen from FIGS. 4, 6 and 7, from a peripheral edge of each elongate slot 23b of the circular cover 23, there inwardly extends a bent guide projection 27. As will be understood from these drawings, the bent guide projections 27 are directed toward the interior of the drive mechanism 10 and as will be described hereinafter, these bent guide projections 27 function to guide movement of the tooth plate 20. From a peripheral edge of the other elongate slot 23c, there inwardly extends a spring engaging bent projection 28. As is seen from FIG. 5, when assembled, the bent projection 28 is set beside the bent engaging piece 21d of the input lever 21 and engaged with the hook portions 22a and 22b of the coil spring 22.

As is seen from FIG. 7, the circular cover 23 is formed at its peripheral edge portion with three bent flanges 29 each having a mounting hole 29a. Furthermore, the circular cover 23 is formed at the peripheral edge portion with three smaller flange portions 30 each having a forked end. The axial length of the smaller flange portions 30 is smaller than that of the bent flanges 29. As will be understood from FIG. 2, when the housing body 11 and the circular cover 23 are butted by their mutually facing sides to constitute the brake housing 8, the three smaller flange portions 30 are brought into engagement with the three engaging recesses 11c of the housing body 11. With this, the housing body 11 and the circular cover 23 are tightly coupled. It is to be noted that the three bent flanges 29 of the circular cover 23 function to fix the brake device 7 to the vehicular seat 1 (see FIG. 1).

As is seen from FIG. 7, the lever bracket 24 is arranged outside of the circular cover 23 and has at its center part a shaft hole 24a in which the smaller diameter shaft part 12a of the output 12 is rotatably received. As is seen from FIG. 3, the lever bracket 24 is formed with a plurality of screw holes 24, and as is seen from FIGS. 3 and 7, the lever bracket 24 is formed with two pairs of smaller rectangular openings 24c with which forked ends 121c of the two bent engaging pieces 21c of the input lever 21 are engaged. That is, when the smaller diameter shaft part 12a of the output shaft 12 is inserted into the shaft hole 23a of the circular cover 23, the forked ends 121c of the two bent engaging pieces 21c are inserted into the smaller rectangular openings 21c and projected forward therefrom.

The forwardly projected parts of the forked ends 121c of each engaging piece 21c are bent toward each other to secure a tight connection between the lever bracket 24 and the input lever 21. If desired, the forwardly projected parts of the forked ends 121c may be bent away from each other. Due to the tight connection between the lever bracket 24 and the input lever 21, relative rotation therebetween is suppressed, and thus, the lever bracket 24 and the input lever 21 rotate integrally like a single unit.

It is to be noted that the control lever 5 shown in FIG. 1 is tightly connected to the lever bracket 24. For this tight connection, three screw bolts (not shown) are used which are engaged with three screw holes 24b provided by the lever bracket 24. With this arrangement, the lever bracket 24 serves as a controller for the drive mechanism 10 together with the control lever 5.

The essential parts of the brake mechanism 7, such as the output shaft 12 and the two paired semicircular clamp members 14 and 16, and the essential parts of the drive mechanism 10, such as a ring part of the drive wheel 18 and the tooth plate 20 are all produced by metal. Furthermore, such essential parts are quenched to be hardened. While, the brake drum 13 made of metal is not quenched for allowing the cylindrical braking surface 13a thereof to have a suitable sliding engagement with both the larger diameter clamp surface sections 26a and the braking curved sections 26b of the two paired semicircular clamp members 14 and 16. If desired, the brake drum 13 may be produced by a metal that is softer than that of the clamp members 14 and 16.

In the brake device 7 having the above-mentioned construction, the lever bracket 24 (see FIG. 7) and the input lever 21 keep their neutral positions due to the biasing force of the coil spring 22 so long as the control lever 5 (see FIG. 1) fixed to the lever bracket 24 is not applied with a certain rotation force. It is to be noted that FIG. 10 shows a neutral condition of the drive mechanism 10 shown in FIG. 7.

Figure 10:
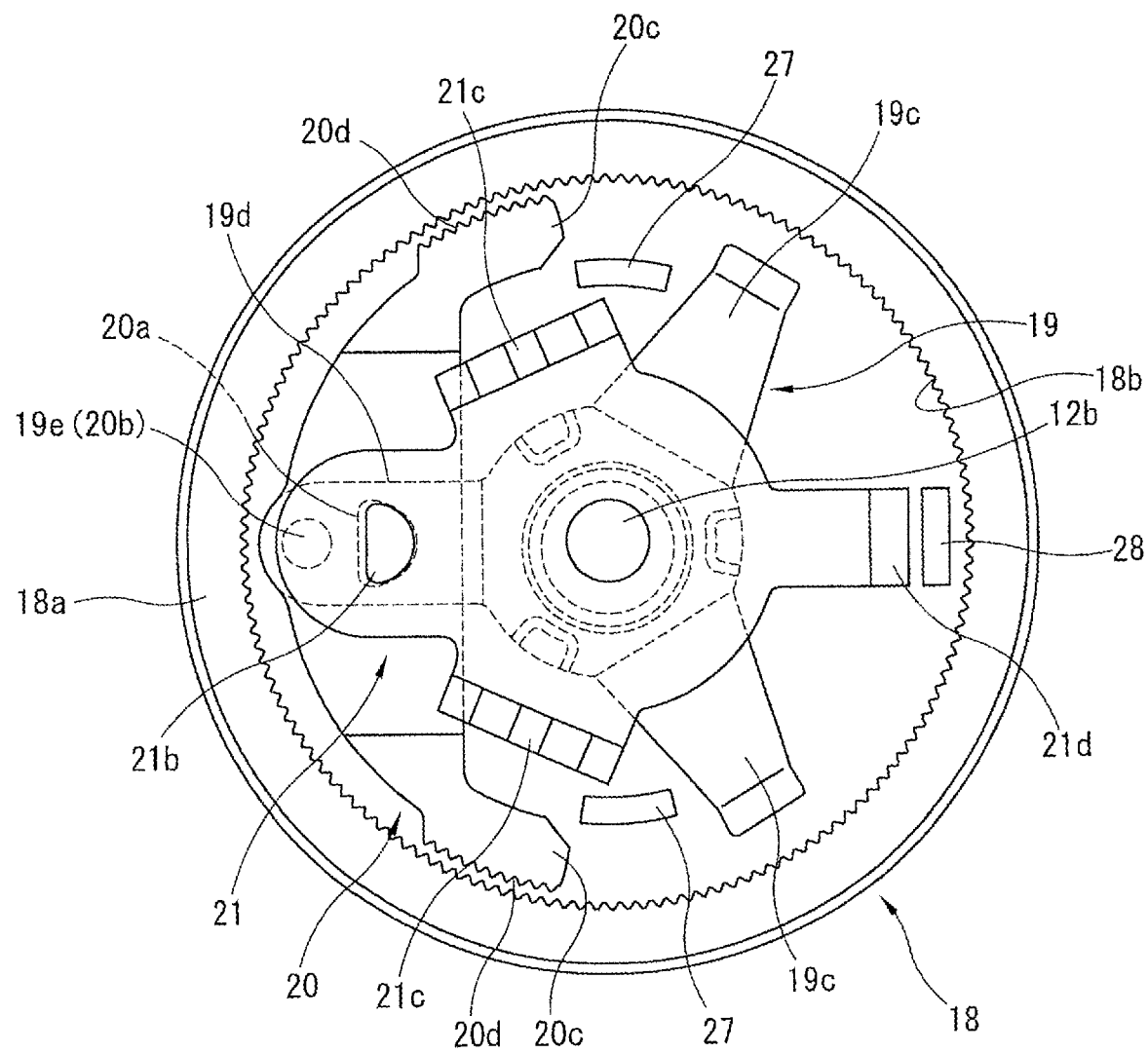
FIG. 10 is a view of the drive mechanism of FIG. 7 in a neutral condition.

That is, as is seen from FIG. 10, in the neutral condition of the drive mechanism 10, the tooth plate 20 assumes its neutral position, and thus, the external teeth 20d of both ends of the tooth plate 20 are kept apart from the internal teeth 18b of the drive wheel 18. At the same time, in the brake mechanism 9 (see FIGS. 7 and 8), the projections 14a and 14a and the projections 16b and 16b of the two paired clamp members 14 and 16, which are biased by the respective composite springs 15 and 17, are pressed against the mutually opposed two flat rectangular surfaces 12e of the output shaft 12 and at the same time, the longitudinally opposed clamp surfaces 26 of the clamp members 14 and 16 are pressed against the cylindrical braking surface 13a of the brake drum 13. Under this condition, the output shaft 12 is suppressed from rotating in normal and reverse directions to keep its neutral position due to a frictional force produced between the clamp members 14 and 16 and the brake drum 13.

Figure 11:
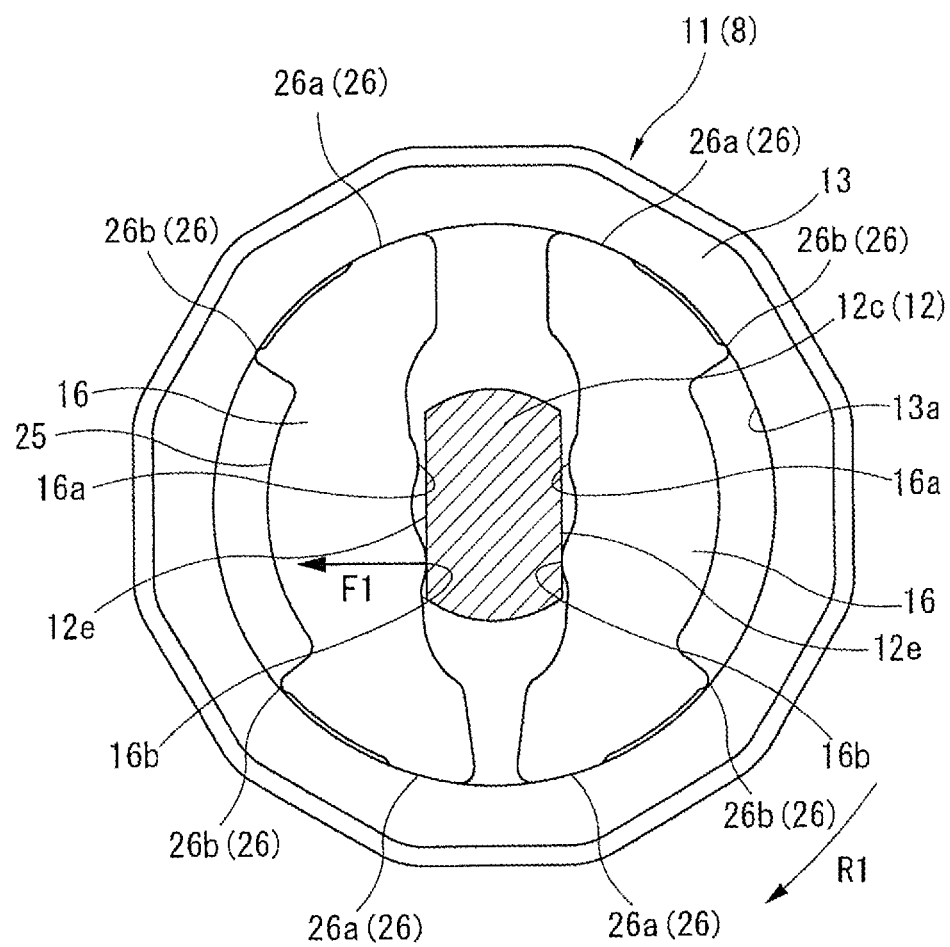
FIG. 11 is a simplified view of the brake mechanism of FIG. 8.

The above-mentioned braking work of the brake mechanism 9 will be much easily understood from FIG. 11 that is provided by simplifying FIG. 8. When the control lever 5 (see FIG. 1) is in its neutral position together with the lever bracket 24, a so-called reverse input is applied from the seat lifter mechanism to the brake device 7 when the seat holds a passenger. This reverse input intends to rotate the output shaft 12 for example in the direction of the arrow "R1" using the pinion gear 12d (see FIG. 7) as an input part.

As is seen from FIG. 11, the force "F1" applied from the two flat rectangular surfaces 12e of the output shaft 12 to one (viz., left one) of the clamp members 16 provides both a force that presses the clamp surfaces 26 at right angles against the cylindrical braking surface 13a of the brake drum 13 and a force that forces the clamp surfaces 26 of the clamp members 16 to slide along the cylindrical braking surface 13a of the brake drum 13. The materials of the clamp members 16 and the brake drum 13, the contact area established therebetween and the surface roughness of the cylindrical braking surface 13a of the brake drum 13 are previously determined and set so that the force for slidably moving the clamp surfaces 26 on and along the cylindrical braking surface 13a is smaller than a frictional force produced between the cylindrical braking surface 13a of the brake drum 13 and one of the clamp members 16. Thus, undesired slippage is not taken place between the cylindrical braking surface 13a of the brake drum 13 and the pair of clamp members 16, and the braking condition therebetween is suitably kept by the frictional force.

In FIG. 11, only one pair of clamp members 16 including the composite spring 17 (see FIG. 7) are shown. The other pair of clamp members 14 including the other composite spring 15 (see FIG. 7) are arranged behind or below the shown pair of clamp members 16 while keeping an upside down. These clamp members 14 make a similar operation to the clamp members 16. Accordingly, as will be understood from FIG. 7, the braking condition illustrated by FIG. 11 is actually effected and kept by the left one of the clamp members 16 and the right one of the clamp members 14.

Figure 12:
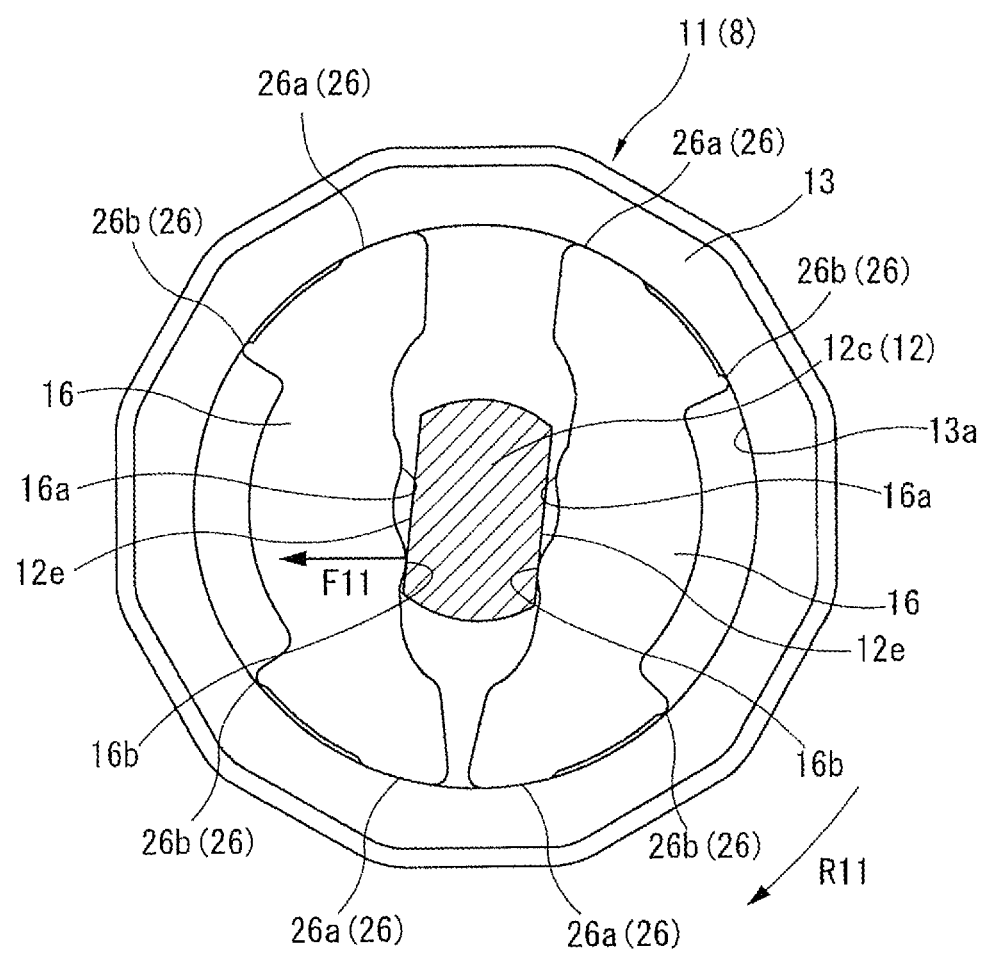
FIG. 12 is a view similar to FIG. 11 but showing a condition taken when an abnormally big load is applied to the brake mechanism.

FIG. 12 shows a condition of the brake device 7 that is taken when, with the brake mechanism 9 keeping the braking condition, an abnormally big force is suddenly applied to the brake device 7 from the sheet lifter mechanism through the pinion gear 12d of the output shaft 12 due to a vehicle collision or the like.

That is, when such big force is suddenly applied to the brake device 7, the brake mechanism 9 is forced to change its condition from the condition shown by FIG. 11 to the condition shown by FIG. 12. That is, as is seen from FIG. 12, when such abnormally big force is applied to the output shaft 12 through the pinion gear 12d to rotate the output shaft 12 in a direction of arrow "R11", the clamp surface 26 of the left one of the clamp members 16 is strongly pressed against the cylindrical braking surface 13a of the brake drum 13 due to a big input load "F11" from the left one of the flat rectangular surfaces 12e of the output shaft 12.

In response to increase of the load input "F11", the left one (as viewed in FIG. 12) of the clamp members 16 and the right one of the clamp members 14 (which are not shown in FIG. 12) are subjected to elastic deformation. With such elastic deformation, as is seen from FIGS. 12 and 9, the larger diameter clamp surface section 26a of the clamp surface 26 of the left one of the clamp members 16 is more strongly pressed against the cylindrical braking surface 13a, and thus, a corner part of the larger diameter clamp surface section 26a near the elongate curved recess 26c is forced to bite into the cylindrical braking surface 13a and at the same time, the braking curved section 26b separated from the larger diameter clamp surface section 26a is strongly pressed onto the cylindrical braking surface 13a. The contact surface of the braking curved section 26b relative to the braking surface 13a is quite small as compared with that of the larger diameter clamp surface section 26a, and thus, finally the braking curved section 26b is forced to bite in the cylindrical braking surface 13a while functioning to control the increase of force with which the larger diameter clamp surface section 13a is slidably moved along the cylindrical braking surface 13a.

As is described hereinabove, due to the pressing and biting of the larger diameter clamp surface section 26a and the braking curved section 26b against the cylindrical braking surface 13a, the big input load "F11" produced by a vehicle collision or the like is assuredly or safely received by the brake device 7. That is, for the above-mentioned reasons, the sliding between one of the clamp members 16 and the cylindrical braking surface 13a of the brake drum 13 can be controlled and the braking condition of the brake device 7 can be substantially kept even if an abnormally big load "F11" is suddenly applied thereto. It is now to be noted that the other pair of clamp members 14 (see FIG. 7) carry out an operation similar to that of the above-mentioned clamp members 16.

In order to adjust the height of the seat cushion 3 (see FIG. 1) by the seat lifter mechanism, at first, the braking condition of the brake mechanism 9 is released by turning, via the control lever 5, the lever brake 24 (see FIG. 7) in normal or reverse direction.

In FIG. 10, there is shown a neutral condition of the drive mechanism 10 of the brake device 7. In this condition, the external teeth 20d provided at both ends of tooth plate 20 are released from the internal teeth 18b of the drive wheel 18. Furthermore, the rim portions 20c of the tooth plate 20 where the external teeth 20d are formed are released from the bent guide projections 27 that are projected from the circular cover 23.

Figure 13:
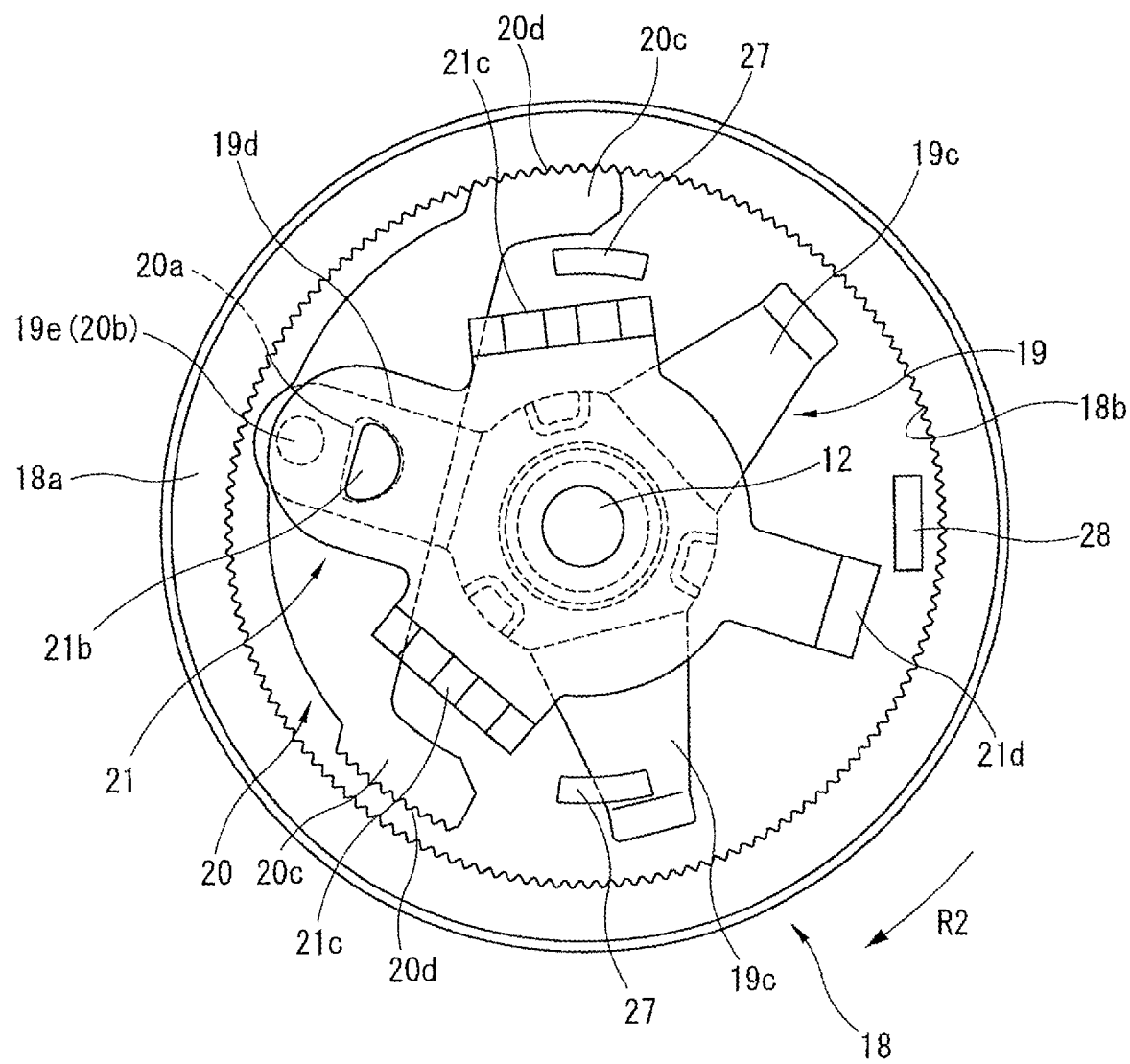
FIG. 13 is a view similar to FIG. 10 but showing a condition taken when a control lever is turned.

If, due to turning of the control lever 5, the lever bracket 24 assuring the position of FIG. 10 is turned in the direction of arrow "R2" to a position shown in FIG. 13, the input lever 21 of the drive mechanism 10 is integrally turned in the same direction and thus, the tooth plate 20 is pressed by the shaft part 21b of the input lever 21 to turn in the direction of arrow "R2" about the shaft hole 20a.

The tooth plate 20 is rotatably supported by the pin 19e of the holding plate 19 through the pin hole 20b, and when rotated in the direction of arrow "R2", the holding plate 19 receives a certain rotational resistance due to its compressed contact against the bottom wall surface of the drive wheel 18. Accordingly, the tooth plate 20 is turned about the shaft part 19e in a counterclockwise direction in FIG. 13, that is, in a direction opposite to the direction of arrow "R2". At this time, the lower rim portion 20c (see FIG. 10) of the tooth plate 20 takes a position away from the bent guide projection 27 projected from the circular cover 23, and thus, rotation of the tooth plate 20 about the pin 19e is not suppressed or blocked. Accordingly, in such case, the external teeth 20d of the upper rim portion 20c are brought into engagement with the internal teeth 18b of the drive wheel 18. When, with the condition being kept, the input lever 21 is applied with a further force in the direction of arrow "R2" of FIG. 13, the input lever 21, the tooth plate 20, the holding plate 19 and the drive wheel 18 are integrally rotated in the direction of arrow "R2" like a single unit.

As is seen from FIG. 13, when the input lever 21 is turned from its neutral position to the position shown in the drawing, the upper rim portion 20c of the tooth plate 20 takes a position to cover the upper bent guide projection 27. Accordingly, even if the tooth plate 20 is forced to turn in a clockwise direction in FIG. 13, the external teeth 20d of the lower rim portion 20c fail to engage with the internal teeth 18b of the drive wheel 18 due to instant abutment of the upper rim portion 20c against the upper bent guide projection 27. Accordingly, when the input lever 21 assuming the position shown in FIG. 13 is forced to return to the neutral position, the input lever 21, the tooth plate 20 and the holding plate 19 are integrally turned to their neutral positions like a single unit because the lower external teeth 20d fail to engage with the internal teeth 18b of the drive wheel 18 due to the abutment between the upper rim portion 20c and the upper bent guide projection 27. Accordingly, in case of returning the input lever 21 assuming the condition of FIG. 13 to the neutral position, the input lever 21, the tooth plate 20 and the holding plate 19 are integrally turned to their neutral positions keeping the lower external teeth 20d away from the internal teeth 18.

As is seen from FIG. 4, since the paired bent engaging pieces 21c of the input lever 21 turning with the control lever 5 are respectively received in the paired elongate slots 23b of the circular cover 23, the turning stroke of the control lever 5 is restricted when at least one of the bent engaging pieces 21c is brought into abutment with a longitudinal end of the corresponding elongate slot 23b of the circular cover 23.

When the drive wheel 18 is pushed by the tooth plate 20, the rotation suppression of the output shaft 12 by the two pairs of clamp members 14 and 16 is cancelled. As is seen from FIG. 8, since the paired arcuate cancelling pawls 18d of the drive wheel 18 are put in the curved recesses 25 of the paired clamp members 14 and 16, the rotation of the drive wheel 18 in the direction of the arrow "R2" causes the left clamp member 16 (see FIG. 8) and the right clamp member 14 to rotate in the same direction. With this operation, the mutually opposed two flat rectangular surfaces 12e of the output shaft 12 are released from the sandwich action by the two pairs of clamp members 14 and 16, and thus, the braking condition of the brake mechanism 9, that has been kept, is cancelled. Due to this cancellation, the output shaft 12 becomes rotatable relative to the brake drum 13 permitting the clamp members 16 to be swingable to the brake drum 13.

The rotation of the output shaft 12 caused by the drive wheel 18 pressed by the tooth plate 20 is carried out after the square shaft part 12c of the output shaft 12 rotates in the rectangular hole 18c of the drive wheel 18 by a certain angle corresponding to the amount of play therebetween. That is, when the mutually opposed two flat rectangular surfaces 12e of the square shaft part 12c (see FIG. 7) are brought into abutment against side walls of the rectangular hole 18c, the output shaft 12 is turned in the direction of arrow "R2" in FIG. 13. Upon this, the right clamp member 16 (see FIG. 8) is forced to turn in the same direction as the output shaft 12. Due to their integral connection, the pinion gear 12d (see FIG. 7) integrally turns with the output shaft 12, and due to turning of the pinion gear 12d, a driven gear (not shown) of the seat lifter mechanism meshed with the pinion gear 12d is turned to change the height of the seat cushion 3 to for example a lower position.

It is to be noted that the above-mentioned movements of the paired clamp members 16 and 16 (see FIG. 8) at the time of cancelling the braking condition are substantially the same as those of the other paired clamp members 14 and 14. That is, cancelling the braking condition of the brake mechanism 9 is carried out by synchronous operations of the two pairs of clamp members 14, 14, 16 and 16. As will be understood from the above description, the vertical displacement of the seat cushion 3 (or vehicular seat 1) is small for one stroke of the control lever 5. Thus, usually a desired height of the seat cushion 3 is obtained by applying plural turning actions to the control lever 5.

It is to be noted that to the control lever 5 secured to the lever bracket 24 (see FIG. 7), there is constantly applied a biasing force (or returning force) from the coil spring 22. Thus, when the seat occupant releases an actuating force from the control lever 5, the control lever 5 is returned to the neutral position due to the biasing force of the coil spring 22. During this retuning movement, the input lever 21, the holding plate 19 and the tooth plate 20 of the drive mechanism 19 are returned from their positions shown in FIG. 13 to their neutral positions shown in FIG. 10.

When, during the returning turning to the neutral positions, the input lever 21 is turned in a counterclockwise direction, viz., in a direction opposite to the direction of arrow "R2" in FIG. 13 for taking the neutral position, the tooth plate 20 is turned about the pin 19e of the holding plate 19 in a clockwise direction. In response to this clockwise turning of the tooth plate 20, the upper external teeth 20d of the tooth plate 20 are released from the internal teeth 18b of the drive wheel 18 and at the same time, the lower external teeth 20d of the tooth plate 20 are brought into engagement with the internal teeth 18b of the drive wheel 18.

Under this situation, by the provision of the upper bent guide projection 27 (see FIG. 13) of the circular cover 23, further turning of the upper rim portion 20c of the tooth plate 20 is suppressed. Accordingly, the upper and lower external teeth 20d and 20d of the tooth plate 20 are not engaged with the internal teeth 18b of the drive wheel 18, and thus, the input lever 21, the tooth plate 20 and the holding plate 19 are turned to their initial positions of FIG. 10 leaving the drive wheel 18 at its initial position and without inducing turning of the drive wheel 18 and the output shaft 12. Then, when the tooth plate 20 is turned back to its initial position, the upper rim portion 20c thereof is released from the upper bent guide projection 27 of the circular cover 23, so that, as is seen from FIG. 10, the upper and lower external teeth 20d and 20d of the tooth plate 20 are brought into a condition to be engageable with the internal teeth 18b of the drive wheel 18.

As is seen from FIGS. 8 and 10, the brake mechanism 9 and the drive mechanism 10 have each an inner construction, or power train, that is bilaterally symmetrical or vertically symmetrical. Accordingly, even if the control lever 5 is turned in a direction opposite to the above-mentioned direction, that is, a direction opposite to the direction indicated by arrow "R2" in FIGS. 8 and 13, substantially same operations of the brake mechanism 9 and the drive mechanism 10 as the above are carried out except for the rotation direction of rotatable parts of the mechanisms 9 and 10.

In the brake device 7, the drive wheel 18, the holding plate 19, the tooth plate 20, the input lever 21 and the coil spring 22, which are component parts of the drive mechanism 10, are all received in the circular cover 23. Entire construction of the brake device 7 including the brake mechanism 9 can be made compact in size. Furthermore, since the drive elements except for the lever brake 24 forming part of the control lever 5 are not exposed to the outside, there is no possibility of interference between the drive elements and the seat cushion 3 of the vehicular seat 1, which brings about a smoothed operation of the brake device 7.

Furthermore, since, in case of returning the condition of the drive mechanism 10 to its neutral condition, the engaging restriction of the tooth plate 20 is effected by the bent guide projections 27 integrally provided by the circular cover 23, there is no need of providing the tooth plate 20 with projections, and thus, reduction in number of parts and reduction in cost are achieved.

Furthermore, since the two bent engaging pieces 21c and the smaller bent engaging piece 21d are integrally provided by the input lever 21 and the spring engaging piece 28 for the coil spring 22 is provided from the circular cover 23, reduction in number of parts is obtained, which brings about compactness of the entire construction of the brake device 7.

In the following, with the aid of FIG. 9, consideration will be focused on the connection between the cylindrical braking surface 13a of the brake drum 13 and the clamp surface 26 of one of the clamp members 16.

In a known construction such as one disclosed in the above-mentioned Japanese Unexamined Patent Application Publication (Tokuhyo) 2002-511035, upon application of an abnormally big shock due to a vehicle collision or the like, the braking surface of the brake housing is broken while deforming the shape of the brake housing, and thus, as compared with the load that is reversely applied to the pinion gear that serves as a drive side gear, the deformation volume (viz., rotation angle displacement) of the pinion gear becomes very large, which is undesirable.

While, in the present invention, after the larger diameter clamp surface section 26a of one of the clamp members 16 is forced to bite into the cylindrical braking surface 13a of the brake drum 13, the corresponding very small braking curved section 26b is forced to bite into the cylindrical braking surface 13a. Accordingly, the deformation volume (viz., rotation angle displacement) of the pinion gear 12d can be made small as compared with the load that is reversely applied to the pinion gear 12d, and thus, the braking performance is increased. It is to be noted that the above-mentioned advantageous two step biting into the cylindrical braking surface 13a also occurs in the clamp surface 26 of one of the other clamp members 14.

In the above-mentioned brake device 7, deformation of the brake housing 8 is not presupposed. Thus, the thickness of the brake drum 13 with the cylindrical braking surface 13a can be simply increased. In this case, deformation of the braking surface 13a can be decreased. Thus, the deformation volume (viz., rotation angle displacement) of the pinion gear 12d can be further reduced as compared with the load reversely applied to the pinion gear 12d.

Referring to FIGS. 14 to 24, there is shown a brake device practically applied to the seat lifter mechanism of the vehicular seat, which is a second embodiment of the present invention. It is to be noted that FIGS. 14 to 18 correspond to FIGS. 2 to 5 and 7 of the above-mentioned first embodiment.

Figure 14:
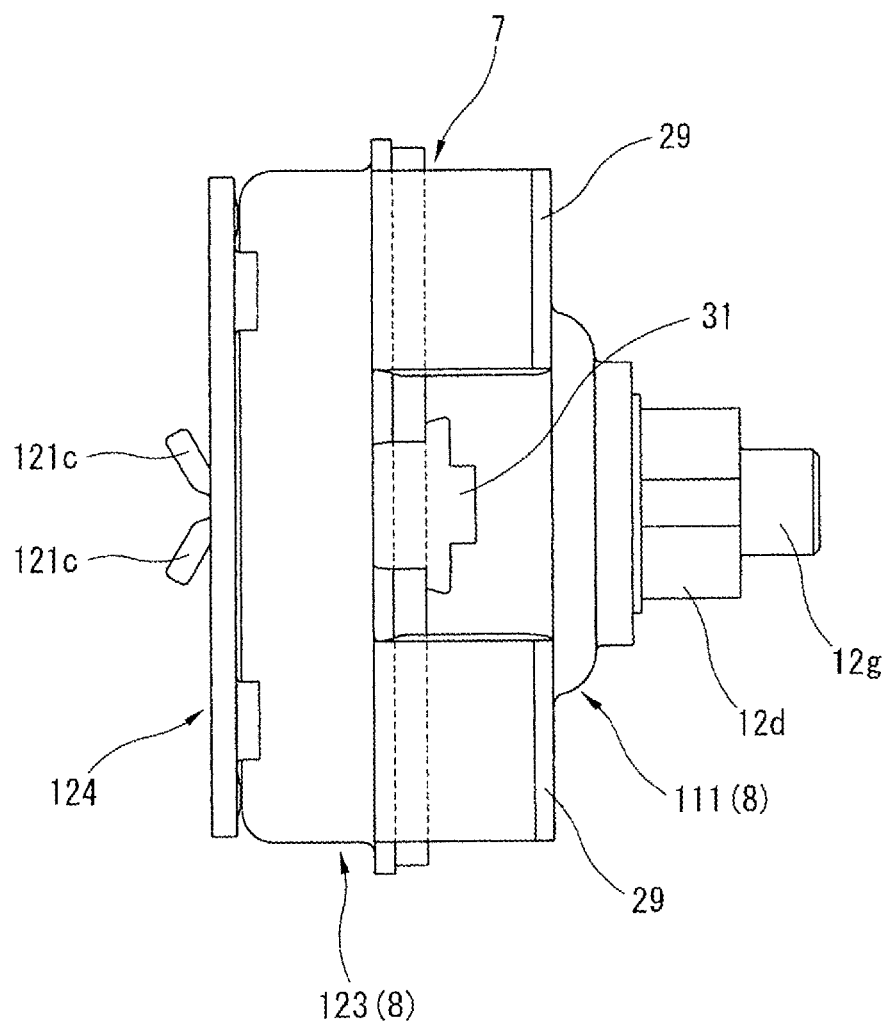
FIG. 14 is a front view of a brake device practically applied to the seat lift mechanism of the vehicular seat of FIG. 1, which is a second embodiment of the present invention.
Figure 15:
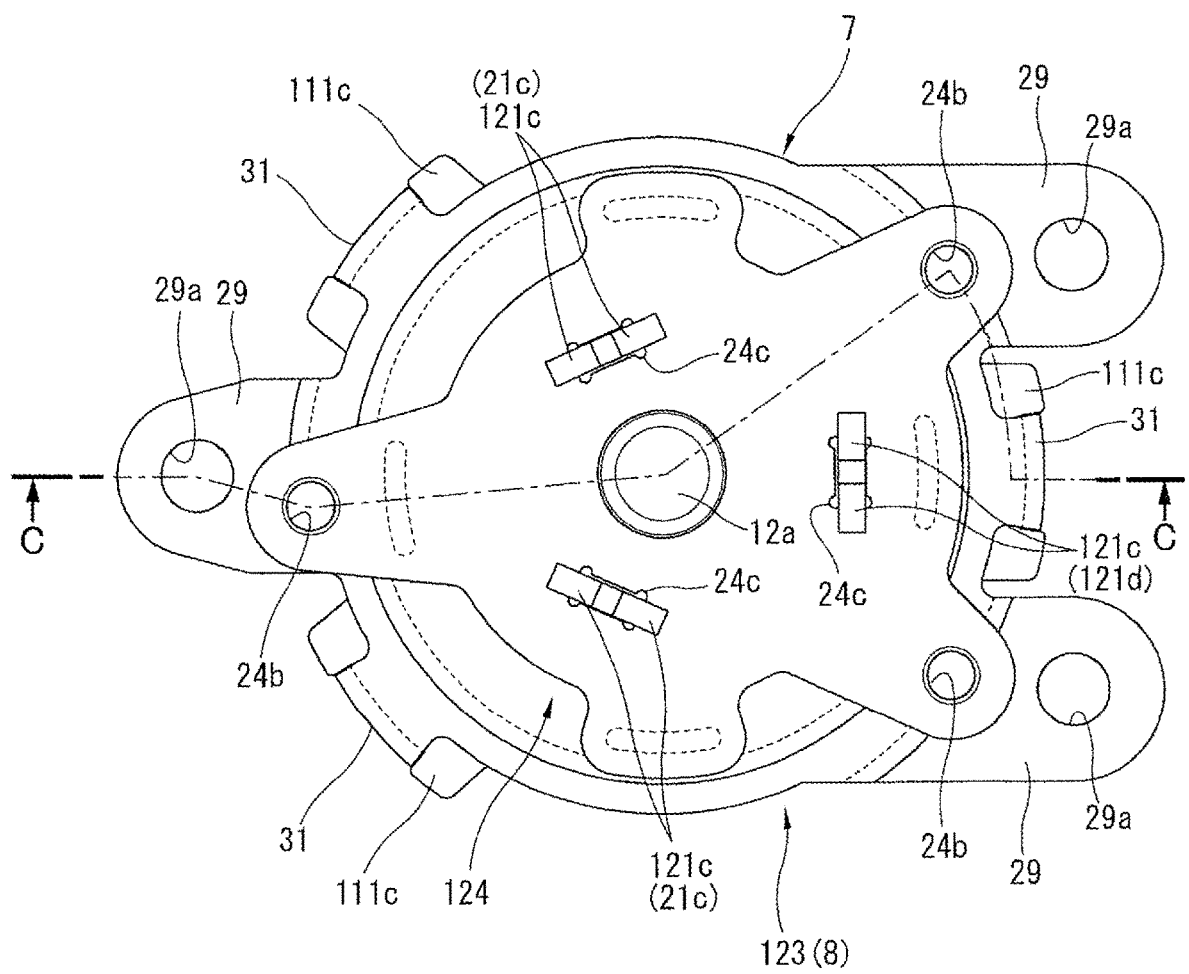
FIG. 15 is a left-side view of the brake device shown in FIG. 14.
Figure 16:
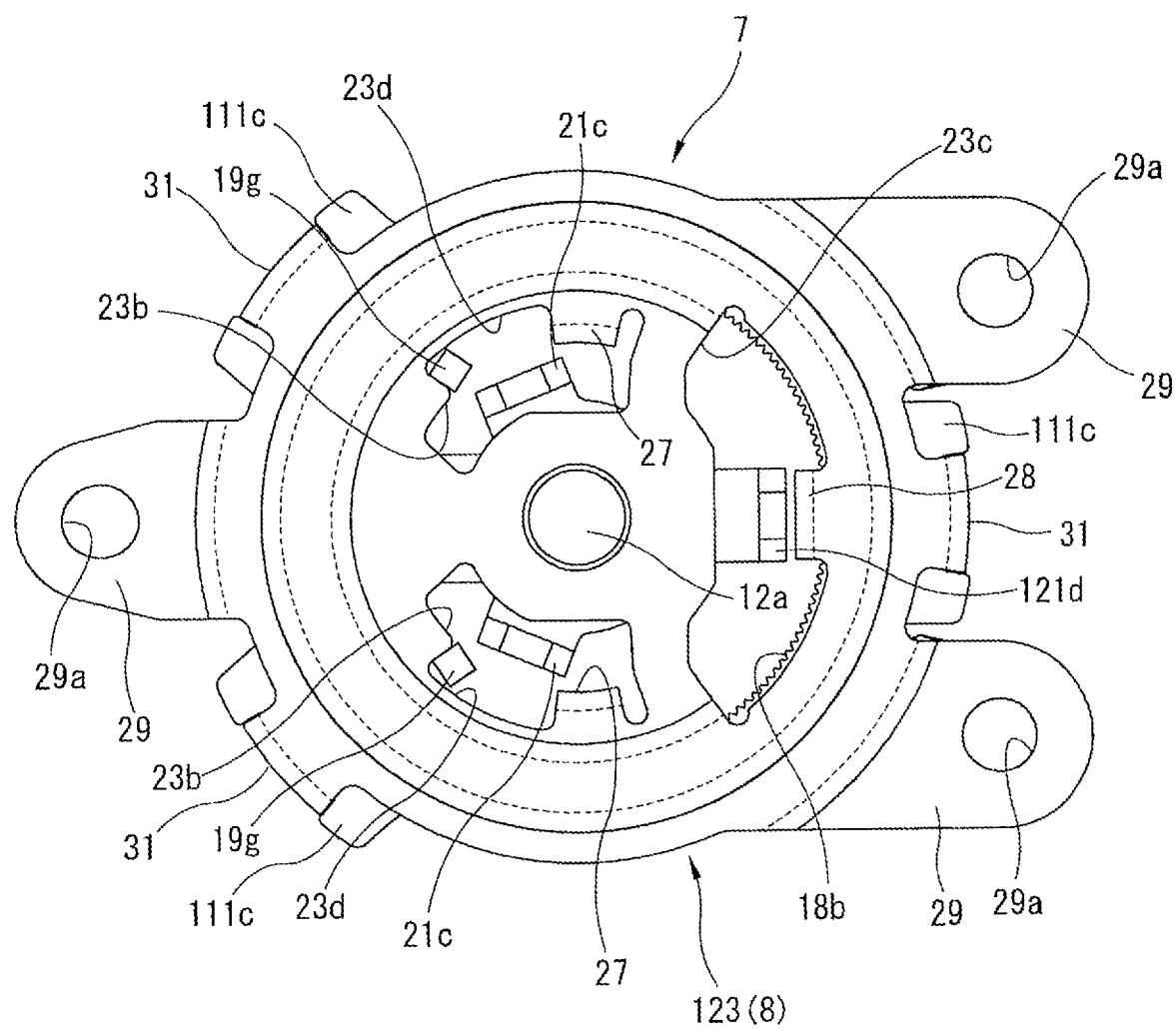
FIG. 16 is a view similar to FIG. 15 but showing a condition without a lever bracket.
Figure 17:
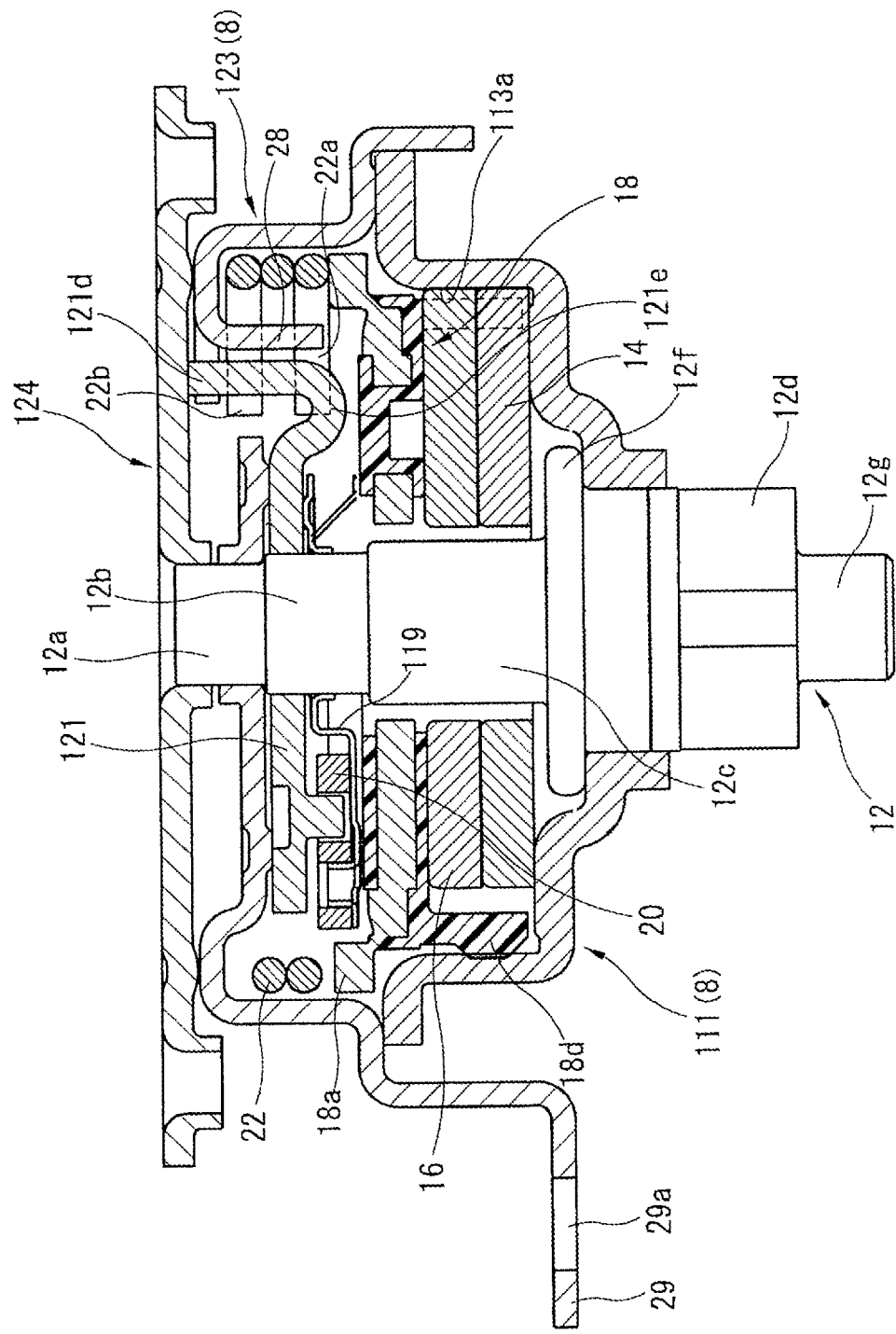
FIG. 17 is a sectional view taken along the line C-C of FIG. 15.
Figure 18:
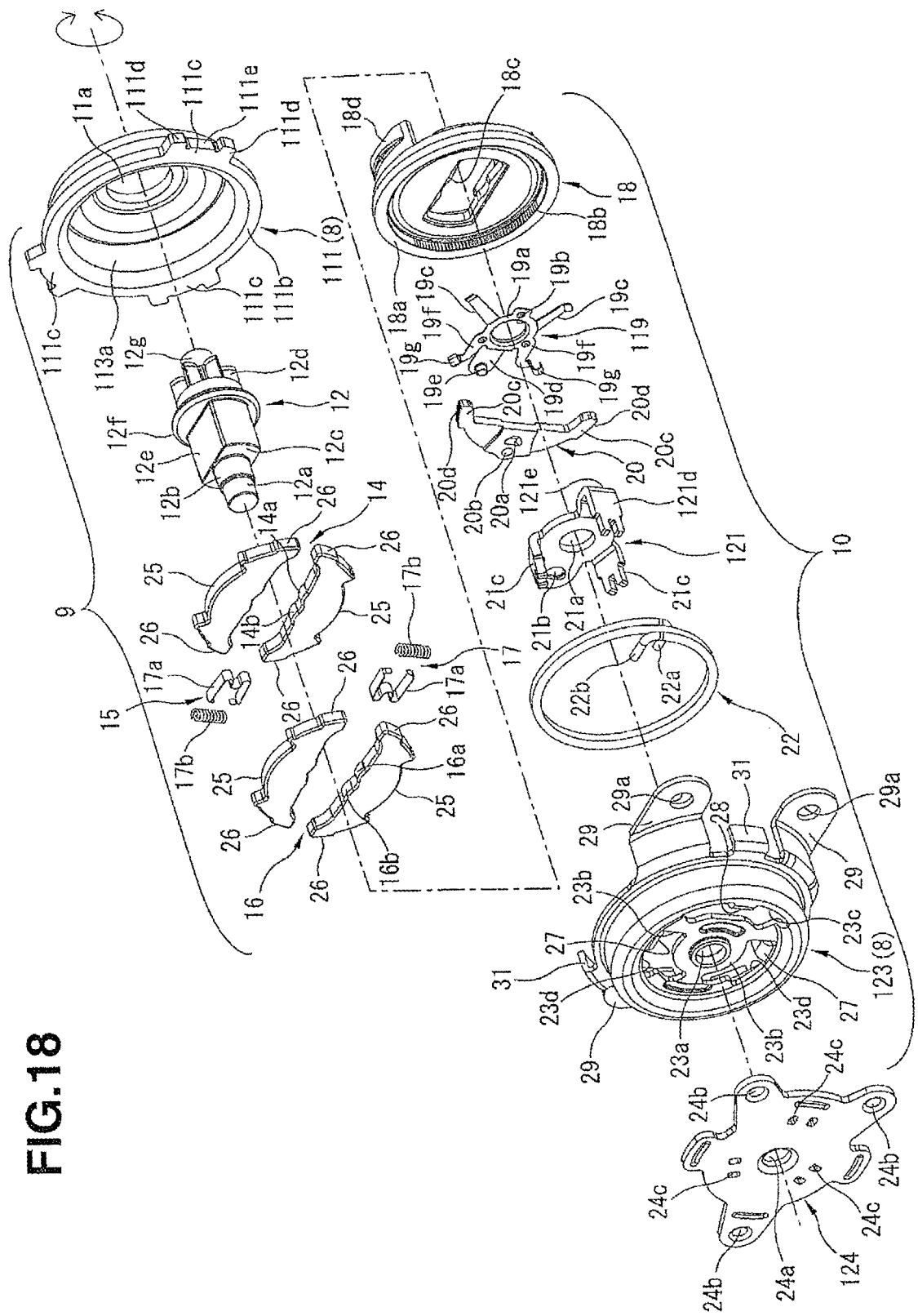
FIG. 18 is an exploded view of a brake mechanism and a drive mechanism that constitute the brake device of FIG. 14.

More specifically, FIG. 14 is a front view of the brake device 7 that is to be mounted on the seat lifter mechanism of the vehicular seat shown in FIG. 1. FIG. 15 is a left side view of the brake device 7 shown in FIG. 14, and FIG. 16 is a left side view of the brake device of FIG. 15 with a lever bracket 124 removed. FIG. 17 is a sectional view taken along the line C-C of FIG. 15, and FIG. 18 is an exploded view of the brake device 7 of FIG. 14, viz., an exploded view of parts constituting a brake mechanism 9 and parts constituting a drive mechanism 10. In FIGS. 14 to 18, parts and portions identical to those of the above-mentioned first embodiment are denoted by the same numerals and explanation of them will be omitted in the following.

As will become apparent when comparing FIG. 18 with FIG. 7 of the first embodiment, (1) In FIG. 18, the brake drum 13 shown in FIG. 7 is not shown, (2) In FIG. 18, the orientation of the mutually opposed two flat rectangular surfaces 12e of the output shaft 12, the two pairs of clamp members 14 and 16 and the drive wheel 18 is different from that of them in FIG. 7 by 90 degrees and (3) In FIG. 18, the cylindrical housing body 111 (11), the input lever 121 (21), the circular cover 123 (23) and the lever bracket 124 (24) are somewhat different in shape from those shown in FIG. 7.

In the following, explanation of the second embodiment will be made with reference to FIG. 18 and with the aid of FIGS. 7 and 14 to 17.

The housing body 111 of the brake mechanism 9 shown in FIG. 18 is shaped like a deep plate and produced by for example pressing a circular metal plate. As will be described in detail hereinafter, the housing body 111 serves as not only the brake housing 8 together with the circular cover 123 but also the brake drum 13. For this serving, as is seen from FIG. 18, the housing body 111 is formed to have a thicker wall as compared with the housing body 11 shown in FIG. 7 although the external appearance of the housing body 111 is substantially the same as the housing body 11. More specifically, the wall thickness of the housing body 111 is smaller than the sum of the wall thickness of the housing body 11 and that of the brake drum 13. As is seen from FIG. 18, a cylindrical inner surface of the housing body 111 serves as a braking surface 113a against which the two pairs of clamp members 14 and 16 slidably abut. The detail of the curved clamp surfaces 26 of the clamp members 14 and 16 is the same as that shown in FIG. 9.

As is seen from FIG. 18, the cylindrical housing body 111 is formed at a bottom wall thereof a shaft hole 11a through which the larger diameter shaft part 12g of the output shaft 12 passes. Furthermore, the housing body 111 is formed at an open edge part thereof with a flange portion 111b that is formed with three engaging projections 111c that project radially outward. As will be described hereinlater, these three projections 111c are connected to the circular cover 123, and each of the projections 111c includes two pawl portions 111d and a recess 111e defined between the pawl portions 111d.

Like the holding plate 19 shown in FIG. 7, the holding plate 119 of the drive mechanism 10 shown in FIG. 18 is of a plate spring type that biases objects in an axial direction of the output shaft 12. The holding plate 119 comprises a boss part 19a that has a shaft hole 19b, a pair of bent spring leg parts 19c that extend radially outward from the boss part 19a to be seated on the inner bottom surface of the drive wheel 18, a bent arm part 19d that extends radially outward from the boss part 19a to be placed behind the tooth plate 20 and a pair of lever portions 19f that extend radially outward from a root portion of the bent arm part 19d.

Figure 19:
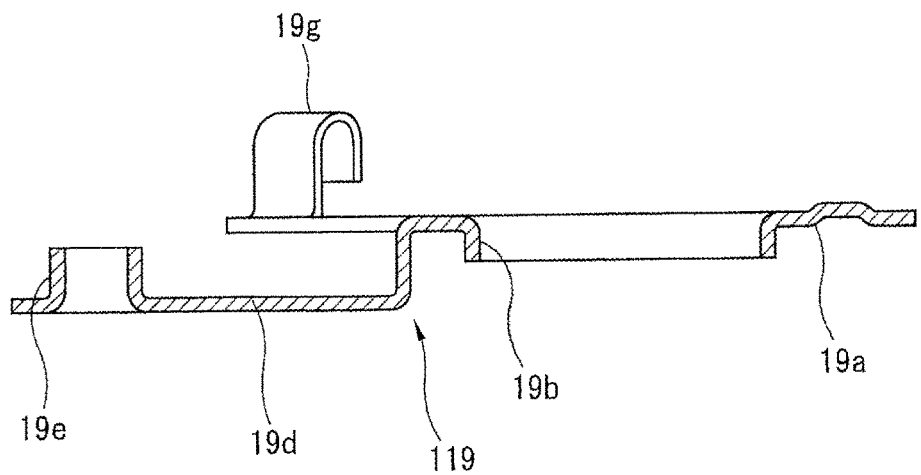
FIG. 19 is an enlarged sectional view of a holding plate shown in FIG. 18.

Between the boss part 19a of the holding plate 119 and the bent arm part 19d of the same, there is defined an axial gap, and the bent arm part 19d is positioned nearer to the drive wheel 18 than the boss part 19a. FIG. 19 is an enlarged sectional view of the holding plate 119 taken along an imaginary line that perpendicular intersects both an axis of the boss part 19a and an axis of a shaft part 19e of the bent arm part 19d. As will be seen from FIGS. 18 and 19, leading ends of the paired lever portions 19f of the holding plate 119 are shaped "U" and bent toward the tooth plate 20 to constitute hook portions 19g. As is seen from FIG. 16, these hook portions 19g are engageable with after-mentioned elongate holes 23d formed in the circular cover 123.

Accordingly, the positional relation between the holding plate 119 (see FIG. 18) and the tooth plate 20 is so made that, due to existence of the axial gap between the boss part 19a of the holding plate 119 and the bent arm part 19d of the same, the tooth plate 20 is put between the boss part 19a of the holding plate 119 and the bent arm part 19d of the same rotatably receiving the pin 19e of the bent arm part 19d into the pin hole 20b of the tooth plate 20. Thus, the paired lever portions 19f of the holding plate 119 which have the hook portions 19g at leading ends thereof are positioned nearer to the input lever 121 than the tooth plate 20.

The input lever 121 of the drive mechanism 10 shown in FIG. 18 is formed at its peripheral edge with two bent engaging pieces 21c each having a forked end like in the input lever 21 shown in FIG. 7. The input lever 121 is further formed at its peripheral edge with a smaller bent engaging piece 121d with a forked end. As is understood from FIG. 18, these three bent engaging pieces 21c, 21c and 121d are projected parallelly toward the circular cover 123 by the same length. While, only the smaller bent engaging piece 21d has an arc-shaped root part 121e that is projected toward the tooth plate 20. The arc-shaped root part 121e is well shown in FIG. 17.

As will be understood from FIG. 18, the circular cover 123 of the drive mechanism 10 is coupled with the housing body 111 of the brake mechanism 9 to constitute the brake housing 8. Like in the afore-mentioned first embodiment, the component parts of the brake mechanism 9 and those of the drive mechanism 10 are installed in a cylindrical inner space defined by both the circular cover 123 and the housing body 111.

As is seen from FIG. 18, the circular cover 123 is formed at its open side edge facing the housing body 111 with two larger flanges 29 and three smaller engaging flanges 31. As will be understood from FIGS. 18, 14 and 15, when the housing body 111 and the circular cover 123 are butted for forming the brake housing 8, the engaging flanges 31 are brought into engagement with the recesses 111e of the three projections 111c of the housing body 111. Thereafter, both corners of the leading end of each engaging flange 31 are press-crushed to obtain a tight connection between the projections 111c and the engaging flanges 31.

As is seen from FIGS. 18 and 16, the circular cover 123 has a shaft hole 23a at a center of its base wall, paired elongate slots 23b at both sides of the shaft hole 23a and another elongate slot 23c. The shape of the elongate slots 23b and 23c is different from that shown in FIGS. 4 and 7. As is well seen from FIG. 16, each of the elongate slots 23b has a radially projected open part 23d that constitutes an elongate slot extension. The hook portions 19g of the holding plate 119 (see FIG. 18) are pressed, due to their self-elastic force, against right and left edges of the elongate slot extensions 23d respectively.

The two bent engaging pieces 21c of the input lever 121 (see FIG. 18) are projected into the two elongate slots 23b respectively and the smaller bent engaging piece 121d of the input lever 121 is projected into the elongate slot 23c. The smaller bent engaging piece 121d is thus placed near the spring engaging piece 28 of the circular cover 23.

As shown in FIG. 18, the lever bracket 124 is formed with three pairs of smaller rectangular openings 24c with which the forked ends of the three bent engaging pieces 21c, 21c and 121d of the input lever 121 are engaged. When, in assembling work, the circular cover 23 and the lever bracket 124 are coupled, the smaller diameter shaft part 12a of the output shaft is inserted into the shaft hole 24a of the lever bracket 124 and at the same time, the forked ends of the input lever 121 are inserted into the three pairs of smaller rectangular openings 24c of the lever bracket 124. Once the insertion of the forked ends of the input lever 121 into the smaller rectangular openings 24c, leading ends of the forked ends are bent at right angles to assure a tight connection between the lever bracket 124 and the input lever 121.

Figure 20:
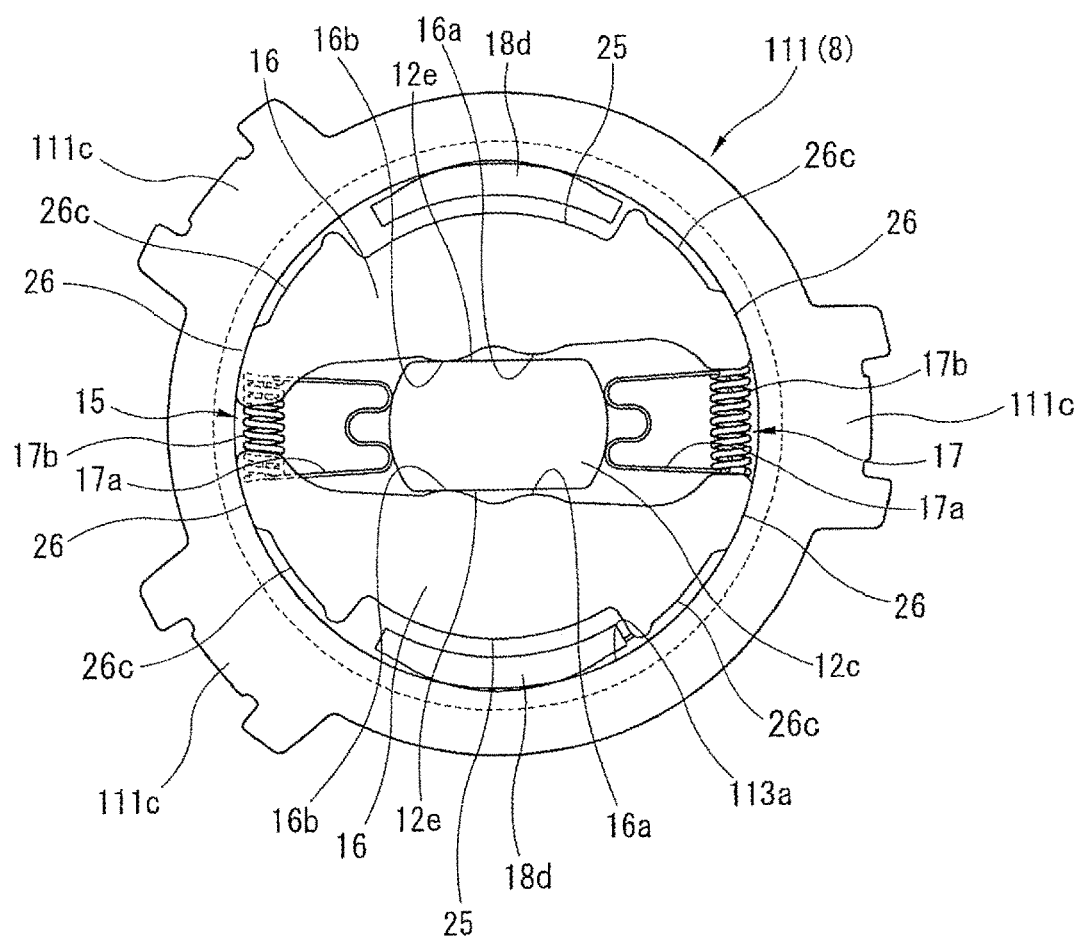
FIG. 20 is a view of the brake mechanism of FIG. 18 in a neutral condition.
Figure 21:
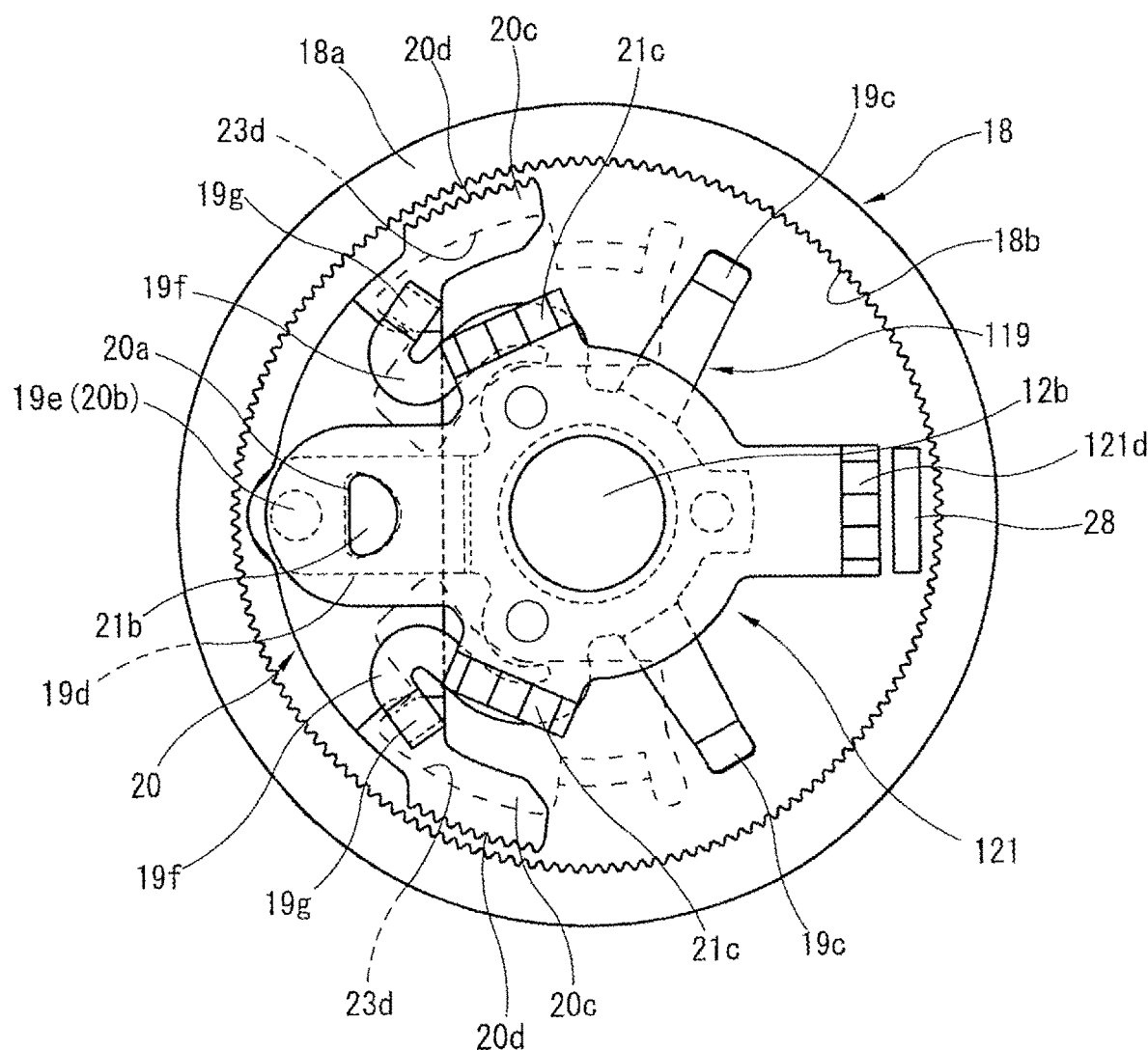
FIG. 21 is a view of the drive mechanism of FIG. 18 in a neutral condition.
Figure 22:
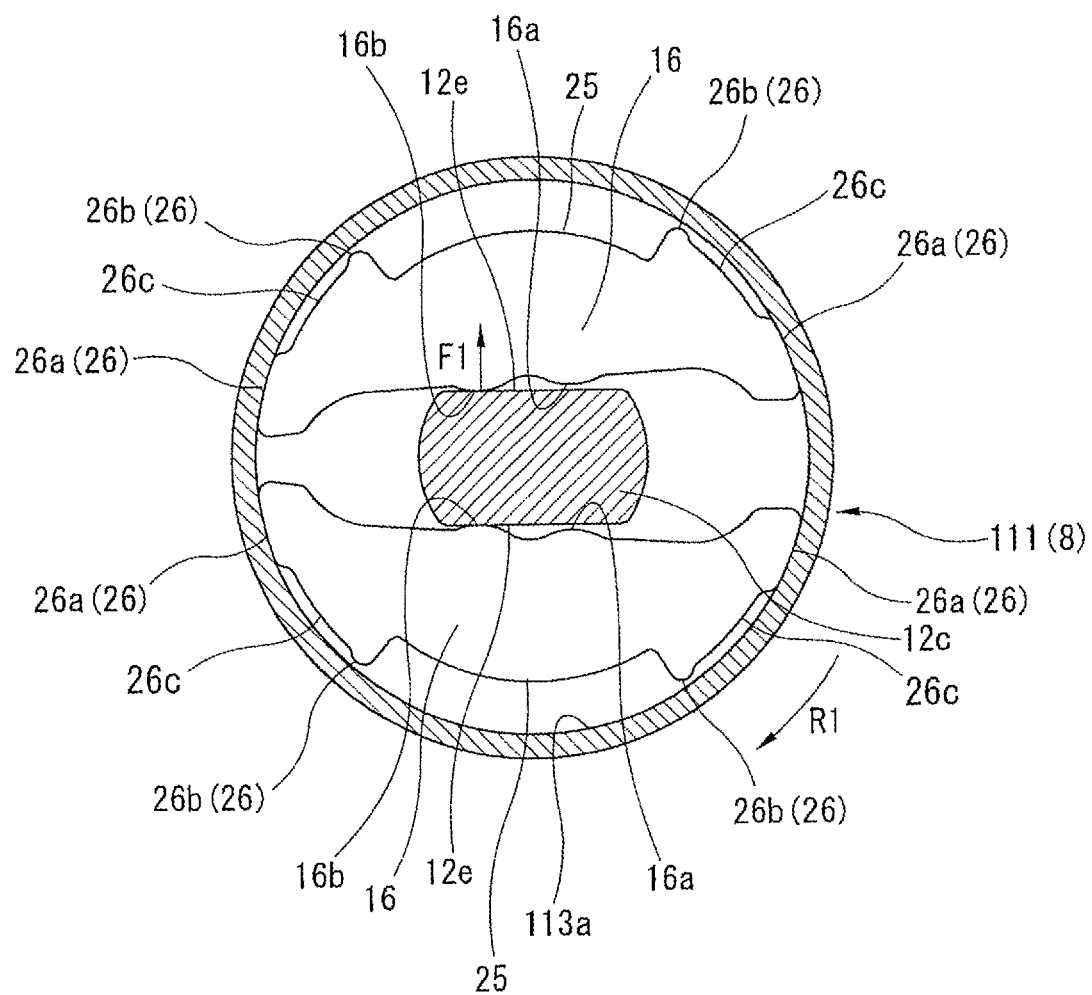
FIG. 22 is a simplified view of the brake mechanism of FIG. 20.

FIGS. 20 to 22 show neutral conditions of the brake mechanism 9 or the drive mechanism 10. FIGS. 20 and 22 show the conditions identical to those of FIGS. 8 and 11 except that the posture of the brake mechanism 9 is different by 90 degrees.

In the second embodiment shown by FIGS. 20 and 22, there is no member that corresponds to the brake drum 13 employed in the first embodiment shown by FIGS. 8 and 11, and thus, as is mentioned hereinabove, the cylindrical inner surface of the housing body 111 serves as a braking surface 113a for the two pairs of clamp members 14 and 16. As is seen from FIGS. 20 and 22, each elongate curved recess 26c is enlarged as compared with that of the first embodiment shown in FIGS. 8 and 11. Thus, in the second embodiment of FIGS. 20 and 22, the contact area of the larger diameter clamp surface section 26a to the cylindrical braking surface 113a is small as compared with that of the first embodiment of FIGS. 8 and 11.

FIG. 21 shows the neutral condition of the drive mechanism 10 in which the paired lever portion 19f including the hook portions 19g are projected toward the side of the input lever 121 as compared with the tooth plate 20 so that both the hook portions 19g are pressed, due to their self-elastic force, against inside edges of the elongate slot extensions 23d of the circular cover 123, The relative positional relation of the other component parts is substantially the same as that shown in FIG. 10.

Figure 23:
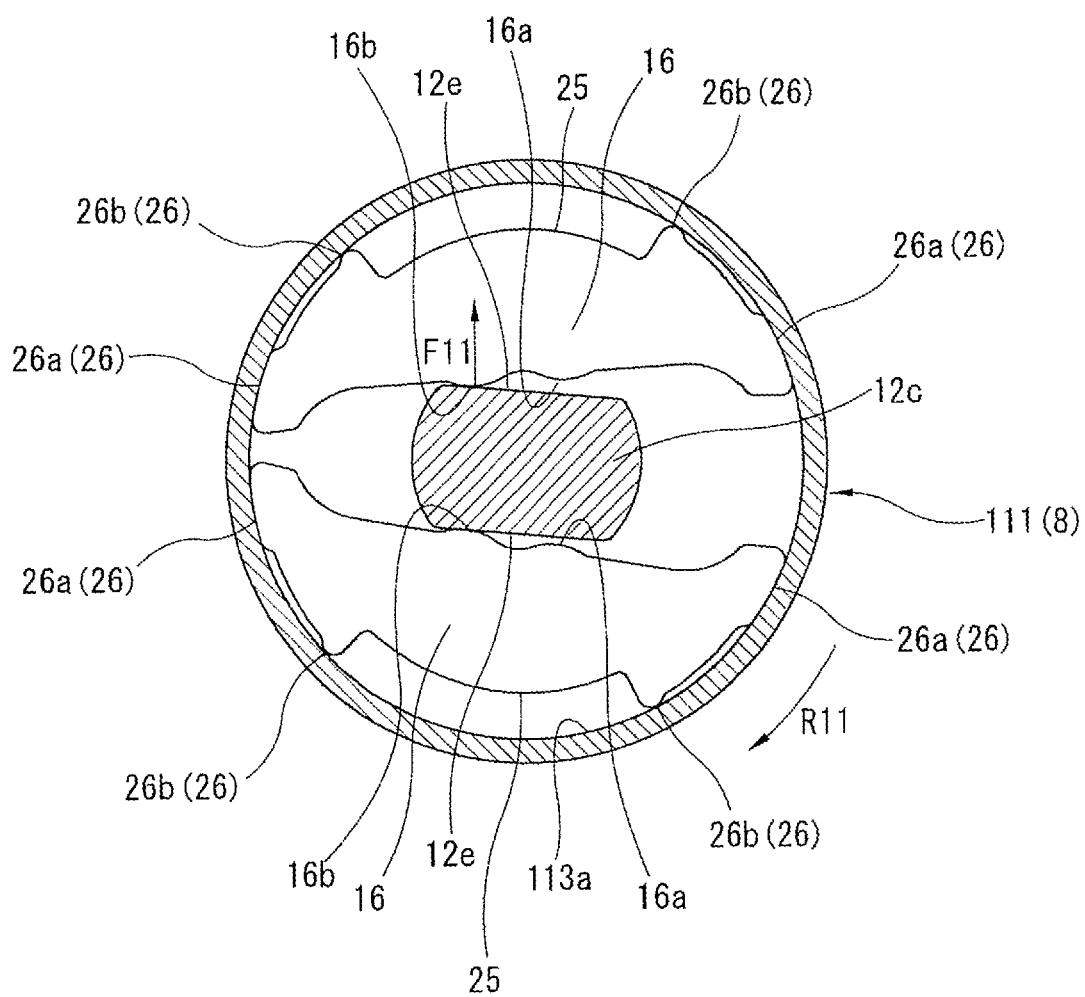
FIG. 23 is a view similar to FIG. 22 but showing a condition taken when an abnormally big load is applied to the brake mechanism.
Figure 24:
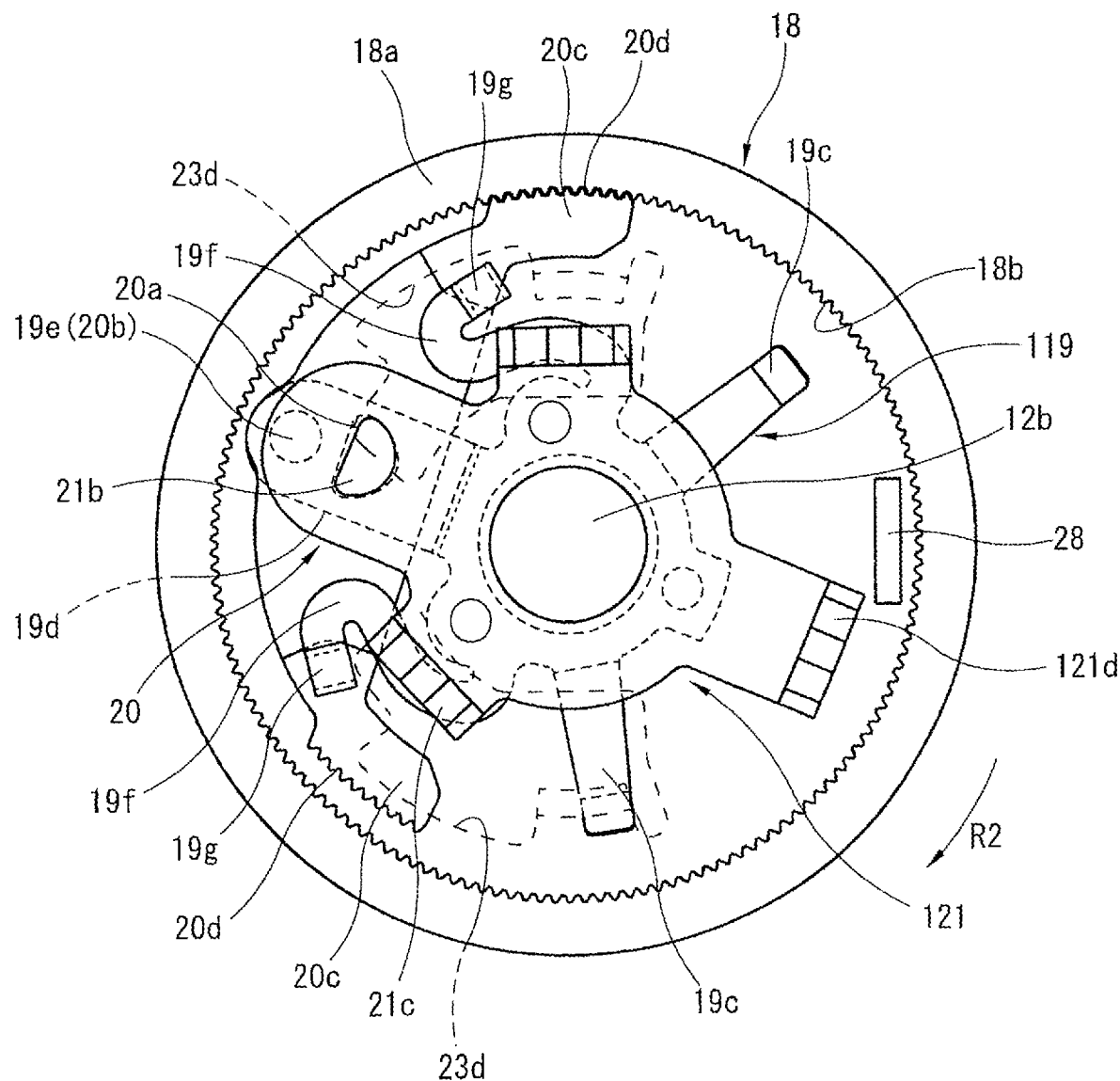
FIG. 24 is a view similar to FIG. 21 but showing a condition taken when a control lever is turned.

FIG. 23 shows a condition of the brake mechanism 9 that is taken when, like in the case shown by FIG. 12, an abnormally big force is suddenly applied to the brake mechanism 9. FIG. 24 shows a condition of the drive mechanism 10 that is taken when, like in the case shown by FIG. 13, a rotation operation is applied thereto, and FIG. 23 shows the condition identical to that of FIG. 12 except that the posture of the brake mechanism 9 is different by 90 degrees.

When the brake mechanism 9 of the second embodiment is applied with an abnormally big shock due to a vehicle collision or the like, the parts of the brake mechanism 9 take positions as shown in FIG. 23. As has been mentioned hereinabove, in the second embodiment, a member that corresponds to the brake drum 13 of the first embodiment (see FIG. 12) is not used, and thus, in the second embodiment, the housing body 111 is constructed to serve as the brake drum also. Upon application of the abnormally big force to the brake mechanism 9, the larger diameter clamp surface sections and the braking curved sections 26b of the two pairs of the clamp members 14 and 16 are forced to bite into the cylindrical braking surface 113a of the housing body 111, which is substantially the same as that taken in the first embodiment. When the big force is applied to the housing body 111, there is a concern that the housing body 111 is deformed. However, due to increased thickness by the provision of the cylindrical braking surface 113a, deformation of the housing body 111 makes little difference.

FIG. 24 shows a condition of the drive mechanism 10 that is taken when the rotation action is carried out. As shown, when the input lever 121 is turned in the direction of arrow "R2", the tooth plate 20 and the holding plate 119 are rotated in the same direction "R2" by predetermined angles. In this case, the hook portions 19g of the holding plate 119 are shifted or turned from the positions shown in FIG. 21 to the positions shown in FIG. 24. That is, the upper hook portion 19g as shown in FIG. 24 of the holding plate 119 comes to the illustrated position after releasing from the inside surface of the upper radially projected open part 23d (as viewed in FIG. 24) of the circular cover 123 and the lower hook portion 19g shown in FIG. 24 comes to the illustrated position after releasing from the inside surface of the lower radially projected open part 23d of the circular cover 123, and finally, these two hook portions 19g are shifted to positions behind the side wall of the circular cover 123 due to their stored resilient force.

During the time when the condition shown in FIG. 24 is returned to the condition shown in FIG. 21, the upper hook portion 19g (see FIG. 21) of the holding plate 119 is brought into contact with the inside surface of the upper radially projected open part 23d to press the same and at the same time the lower hook portion 19g (see FIG. 21) that has been concealed behind the side wall of the circular cover 123 is brought into contact with the inside surface of the lower radially projected open part 23d to press the same. The above-mentioned movement of the hook portions 19g of the holding plate 19 provides the drive mechanism 10 with an assured returning of the inlet lever 121, the control lever 5 (see FIG. 1) and the holding plate 119 to their neutral positions. It is to be noted that the above-mentioned movement of the parts is carried out similarly in a case where the input lever 121 (see FIG. 24) is turned in a direction opposite to the direction "R2".

The above explanation on the second embodiment is directed to the portion and parts that are largely different from those of the first embodiment. It is to be noted that other portion and parts of the second embodiment are substantially the same as those of the first embodiment.

As will be well understood when comparing FIG. 18 of the second embodiment with FIG. 7 of the first embodiment, in the second embodiment, the cylindrical housing body 111 is made thicker than the cylindrical housing body 11 of the first embodiment and there is no member that corresponds to the brake drum 13 of the first embodiment. Thus, the brake device 7 of the second embodiment can exhibit substantially same function as that of the first embodiment and in case of the second embodiment, reduction in number of parts is achieved.

Under the neutral condition of the drive mechanism 10 shown in FIG. 21, the paired hook portions 19g of the holding plate 19 are respectively pressed against the inside surfaces of the radially projected open parts 23d of the circular cover 123. Accordingly, the input lever 121, the tooth plate 20 and the holding plate 119 can be assuredly returned to their neutral positions, which provides the brake device 7 with an assured and stable operation.

Although, in the above, the brake devices 7 installed in a seat shifter mechanism have been described as embodiments of the present invention, the present invention is not limited to such brake devices. If desired, the present invention is applicable to a brake device installed in other type seat adjusters. For example, the brake device of the present invention can be applied to a brake device installed in the seatback reclining mechanism.

The entire contents of Japanese Patent Applications 2016-231928 filed Nov. 30, 2016 and 2017-183107 filed Sep. 25, 2017 are incorporated herein by reference.

Although the invention has been described above with reference to the embodiments of the invention, the invention is not limited to such embodiments as described. Various modifications and variations of such embodiments may be carried out by those skilled in the art, in light of the above description.

What is claimed is:

1. A brake device for use with a seat adjuster, comprising:
an output shaft rotatable about an axis of the output shaft and having a drive gear secured thereto, the output shaft having an operation portion thereof;
a brake mechanism that is able to assume a braking condition to suppress rotation of the output shaft when an external rotational force is suddenly applied to the brake mechanism through the drive gear;
a drive mechanism that is able to release the braking condition of the brake mechanism when a control lever is turned in either one of normal and reverse directions from its neutral position, thereby allowing rotation of the output shaft in either one of normal and reverse directions,
wherein the brake mechanism comprises:
a brake housing having a cylindrical braking surface;
first and second pairs of clamp members that are movably installed and abreast arranged in the brake housing in such a manner that an inside surface of each of the two clamp members of the first pair of clamp members faces an associated inside surface of one of the two clamp members of the second pair of clamp members, each of the two clamp members of each pair of clamp members having at circumferentially both ends thereof first and second clamp surfaces that are slidably engageable with the cylindrical braking surface; and first and second biasing members that bias the first pair of clamp members to pivot away from each other and the second pair of clamp members to pivot away from each other respectively, wherein the output shaft is sandwiched at the operation portion thereof between the respective inside surfaces of the first pair of clamp members and the respective inside surfaces of the second pair of clamp members, so that rotation of the output shaft is braked, and when a drive member of the drive mechanism is operated to move the first and second pairs of clamp members in a manner to cancel the sandwiched condition of the output shaft, the drive member and the output shaft are integrally rotated;

wherein the first clamp surface of each clamp member is a larger diameter clamp surface section that is provided near one end of the inside surface of the clamp member and constantly in slidable contact with the cylindrical braking surface and the second clamp surface is a braking curved section that is provided near an other end of the inside surface of the clamp member and is normally kept away from the cylindrical braking surface; and wherein the braking curved section is brakingly engageable with the cylindrical braking surface when the external rotational force is suddenly applied to the brake mechanism through the drive gear.

2. The brake device as claimed in claim 1, further comprising first and second contacting areas, wherein in which when the external rotational force is suddenly applied to the brake mechanism through the drive gear, the second contacting area with which the second clamp surface is in contact with the cylindrical braking surface is smaller than the first contacting area with which the first clamp surface is in contact with the cylindrical braking surface.

3. The brake device as claimed in claim 1, in which the brake housing comprises a cylindrical housing body made of metal and a brake drum made of metal, the brake drum having the cylindrical braking surface and being coaxially and tightly disposed in the cylindrical housing body.

4. The brake device as claimed in claim 1, in which the operation portion of the output shaft comprises mutually opposed two flat rectangular surfaces formed on a given part of the output shaft.

5. The brake device as claimed in claim 1, in which the first biasing member biases upper ends of the first pair of clamp members to pivot away from each other and the second biasing member biases lower ends of the second pair of clamp members to pivot away from each other.

* * * * *